United States Patent
Huang et al.

(10) Patent No.: US 11,558,899 B2
(45) Date of Patent: Jan. 17, 2023

(54) METHOD AND USER EQUIPMENT OF PERFORMING RESOURCE SWITCHING IN UNLICENSED SPECTRUM

(71) Applicant: INDUSTRIAL TECHNOLOGY RESEARCH INSTITUTE, Zhudong Township, Hsinchu County (TW)

(72) Inventors: Nai-Lun Huang, Zhubei (TW); Jung-Mao Lin, Zhubei (TW); Wan-Jung Tsai, Taoyuan (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 233 days.

(21) Appl. No.: 16/934,554

(22) Filed: Jul. 21, 2020

(65) Prior Publication Data

US 2021/0051715 A1 Feb. 18, 2021

Related U.S. Application Data

(60) Provisional application No. 62/886,971, filed on Aug. 15, 2019.

(51) Int. Cl.
*H04W 74/08* (2009.01)
*H04B 17/318* (2015.01)
*H04W 76/18* (2018.01)

(52) U.S. Cl.
CPC ...... *H04W 74/0808* (2013.01); *H04B 17/318* (2015.01); *H04W 74/0833* (2013.01); *H04W 76/18* (2018.02)

(58) Field of Classification Search
None
See application file for complete search history.

(56) References Cited

U.S. PATENT DOCUMENTS 10,383,103 B2 8/2019 Park et al.
10,420,147 B2 9/2019 Dinan
(Continued)

FOREIGN PATENT DOCUMENTS

CN 106060937 A 10/2016
CN 108476532 A 8/2018
(Continued)

OTHER PUBLICATIONS

Extended European Search Report, dated Dec. 4, 2020, for European Application No. 20190617.9.
(Continued)

*Primary Examiner* — Faiyazkhan Ghafoerkhan
(74) *Attorney, Agent, or Firm* — Birch, Stewart, Kolasch & Birch, LLP

(57) ABSTRACT

A method and a user equipment of performing resource switching in an unlicensed spectrum are provided. A current set of resources in the unlicensed spectrum is utilized by a UE for performing LBT attempts for transmission of an RACH message to a base station. One or more LBT attempts for transmissions from the UE to the base station are performed over the current set of resources during a current RACH procedure. The current set of resources is switched to a new set of resources in the unlicensed spectrum to be utilized by the UE in a new RACH procedure after a failure count reaches a pre-configured threshold during the current RACH procedure. The failure count is calculated at least based on a count of LBT failure over the current set of resources during the current RACH procedure.

38 Claims, 14 Drawing Sheets

(56) References Cited

U.S. PATENT DOCUMENTS

| | | | |
|---|---|---|---|
| 10,575,338 B2* | 2/2020 | Park | H04W 72/0446 |
| 10,681,738 B2* | 6/2020 | Babaei | H04W 74/0833 |
| 11,153,913 B2* | 10/2021 | Chen | H04W 72/1284 |
| 11,172,515 B2* | 11/2021 | Park | H04W 74/0841 |
| 11,252,765 B2* | 2/2022 | Jeon | H04W 74/004 |
| 11,272,535 B2* | 3/2022 | Chen | H04W 36/0069 |
| 11,272,548 B2* | 3/2022 | Agiwal | H04W 74/0891 |
| 11,375,548 B2* | 6/2022 | Pan | H04W 74/0808 |
| 2016/0302230 A1* | 10/2016 | Novlan | H04B 17/318 |
| 2017/0231011 A1* | 8/2017 | Park | H04W 72/0446 |
| 2018/0176961 A1* | 6/2018 | Babaei | H04W 74/0833 |
| 2018/0176981 A1 | 6/2018 | Babaei et al. | |
| 2019/0059029 A1* | 2/2019 | Lunden | H04W 36/30 |
| 2019/0215864 A1 | 7/2019 | Yang et al. | |
| 2020/0008246 A1 | 1/2020 | Dinan | |
| 2020/0037361 A1 | 1/2020 | Chakraborty et al. | |
| 2020/0052803 A1* | 2/2020 | Deenoo | H04B 17/318 |
| 2020/0053779 A1* | 2/2020 | Jeon | H04B 7/0695 |
| 2020/0053799 A1* | 2/2020 | Jeon | H04L 5/0048 |
| 2020/0078909 A1 | 3/2020 | Park et al. | |
| 2020/0100294 A1* | 3/2020 | Chen | H04W 74/0833 |
| 2020/0107277 A1* | 4/2020 | Jeon | H04W 52/36 |
| 2020/0107369 A1* | 4/2020 | Jeon | H04W 72/14 |
| 2020/0112996 A1* | 4/2020 | Pan | H04W 72/0453 |
| 2020/0120713 A1* | 4/2020 | Yerramalli | H04W 24/02 |
| 2020/0146054 A1* | 5/2020 | Jeon | H04L 5/0053 |
| 2020/0146063 A1* | 5/2020 | Xu | H04W 24/08 |
| 2020/0196357 A1* | 6/2020 | Park | H04W 72/0446 |
| 2020/0221309 A1* | 7/2020 | Ozturk | H04L 5/0078 |
| 2020/0221495 A1* | 7/2020 | Chen | H04W 72/044 |
| 2020/0221504 A1* | 7/2020 | Cirik | H04L 1/1864 |
| 2020/0221506 A1* | 7/2020 | Jeon | H04W 74/0833 |
| 2020/0229241 A1* | 7/2020 | Jeon | H04W 74/0833 |
| 2020/0252846 A1* | 8/2020 | Ozturk | H04W 74/0808 |
| 2020/0252967 A1* | 8/2020 | Ozturk | H04W 56/001 |
| 2020/0275485 A1* | 8/2020 | Babaei | H04W 74/0808 |
| 2020/0314917 A1* | 10/2020 | Jeon | H04W 74/08 |
| 2020/0351801 A1* | 11/2020 | Jeon | H04W 52/48 |
| 2021/0007146 A1* | 1/2021 | Agiwal | H04W 24/04 |
| 2021/0014903 A1* | 1/2021 | Zhang | H04W 76/30 |
| 2021/0029768 A1* | 1/2021 | Shih | H04W 76/30 |
| 2021/0051715 A1* | 2/2021 | Huang | H04W 76/18 |
| 2021/0058997 A1* | 2/2021 | Zhang | H04W 76/18 |
| 2021/0092763 A1* | 3/2021 | Li | H04W 48/16 |
| 2021/0099963 A1* | 4/2021 | Jeon | H04W 52/36 |
| 2021/0105812 A1* | 4/2021 | Rastegardoost | H04L 1/08 |
| 2021/0153245 A1* | 5/2021 | Tooher | H04W 72/046 |
| 2021/0185719 A1* | 6/2021 | Xue | H04W 74/0816 |
| 2021/0219268 A1* | 7/2021 | Li | H04L 1/08 |
| 2021/0307078 A1* | 9/2021 | Singh | H04W 74/0833 |
| 2021/0345424 A1* | 11/2021 | Cirik | H04W 74/004 |
| 2021/0360706 A1* | 11/2021 | Cirik | H04W 74/0816 |
| 2021/0410200 A1* | 12/2021 | Cirik | H04W 74/08 |
| 2022/0030623 A1* | 1/2022 | Wang | H04W 74/0808 |
| 2022/0030632 A1* | 1/2022 | Jeon | H04W 16/14 |
| 2022/0039016 A1* | 2/2022 | Terry | H04W 52/0235 |
| 2022/0061055 A1* | 2/2022 | Freda | H04W 72/1263 |
| 2022/0061107 A1* | 2/2022 | Park | H04W 74/0841 |
| 2022/0070928 A1* | 3/2022 | Babaei | H04W 74/004 |
| 2022/0110159 A1* | 4/2022 | Shi | H04W 74/0866 |
| 2022/0124807 A1* | 4/2022 | Hu | H04W 74/006 |
| 2022/0159737 A1* | 5/2022 | Jeon | H04W 56/005 |
| 2022/0201758 A1* | 6/2022 | Wang | H04W 36/305 |
| 2022/0201771 A1* | 6/2022 | Cirik | H04W 72/1263 |
| 2022/0247475 A1* | 8/2022 | Zhou | H04W 74/0816 |
| 2022/0264479 A1* | 8/2022 | Jeon | H04W 74/0866 |

FOREIGN PATENT DOCUMENTS

| | | |
|---|---|---|
| CN | 109863777 A | 6/2019 |
| CN | 110519794 A | 11/2019 |
| TW | 201937974 A | 9/2019 |
| WO | WO 2017/161314 A1 | 9/2017 |
| WO | WO 2019/031796 A1 | 2/2019 |

OTHER PUBLICATIONS

LG Electronics Inc.; "A Mechanism to handle the consistent uplink LBT", 3GPP TSG-RAN WG2 Meeting #106, R2-1907885, Reno, USA, May 13-17, 2019, 2 pages.

Charter Communications, R2-1905168 Views on LBT Impacts in MAC in NR-U Operation, 3GPP TSG-RAN WG2 Meeting #105bis, Apr. 8, 2019.

Convida Wireless, R2-1901537 NR-U LBT Impact on Preamble Transmission Counting, 3GPP TSG-RAN WG2 Meeting #105bis, Feb. 25, 2019.

Convida Wireless, R2-1904397 Additional RACH Opportunities for NR-U, 3GPP TSG-RAN WG2 Meeting #105bis, Apr. 8, 2019.

LG Electronics Inc. R2-1903741 Enhanced RACH procedure based on channel busy level in NR-U, 3GPP TSG-RAN WG2 Meeting #105bis, Apr. 8, 2019.

LG Electronics Inc. R2-1904891 Additional opportunity for Msg1 in 4-step RACH, 3GPP TSG-RAN WG2 Meeting #105bis, Apr. 8, 2019.

Samsung, R2-1903098 Random Access Resource Selection in NR-U, 3GPP TSG-RAN WG2 Meeting #105bis, Apr. 8, 2019.

3GPP, "3rd Generation Partnership Project: Technical Specification Group Radio Access Network; Study on NR-based Access to Unlicensed Spectrum (Release 16)," 3GPP TR 38.889, V16.0.0, Dec. 19, 2018, pp. 1-119.

Mediatek Inc., "MAC Bebaviour for LBT Failures in Msg1 and Msg3 Transmissions" 3GPP TSG-RAN WG2 Meeting #105, R2-1904432, Xi' An, China, Apr. 8-12, 2019, 4 pages.

* cited by examiner

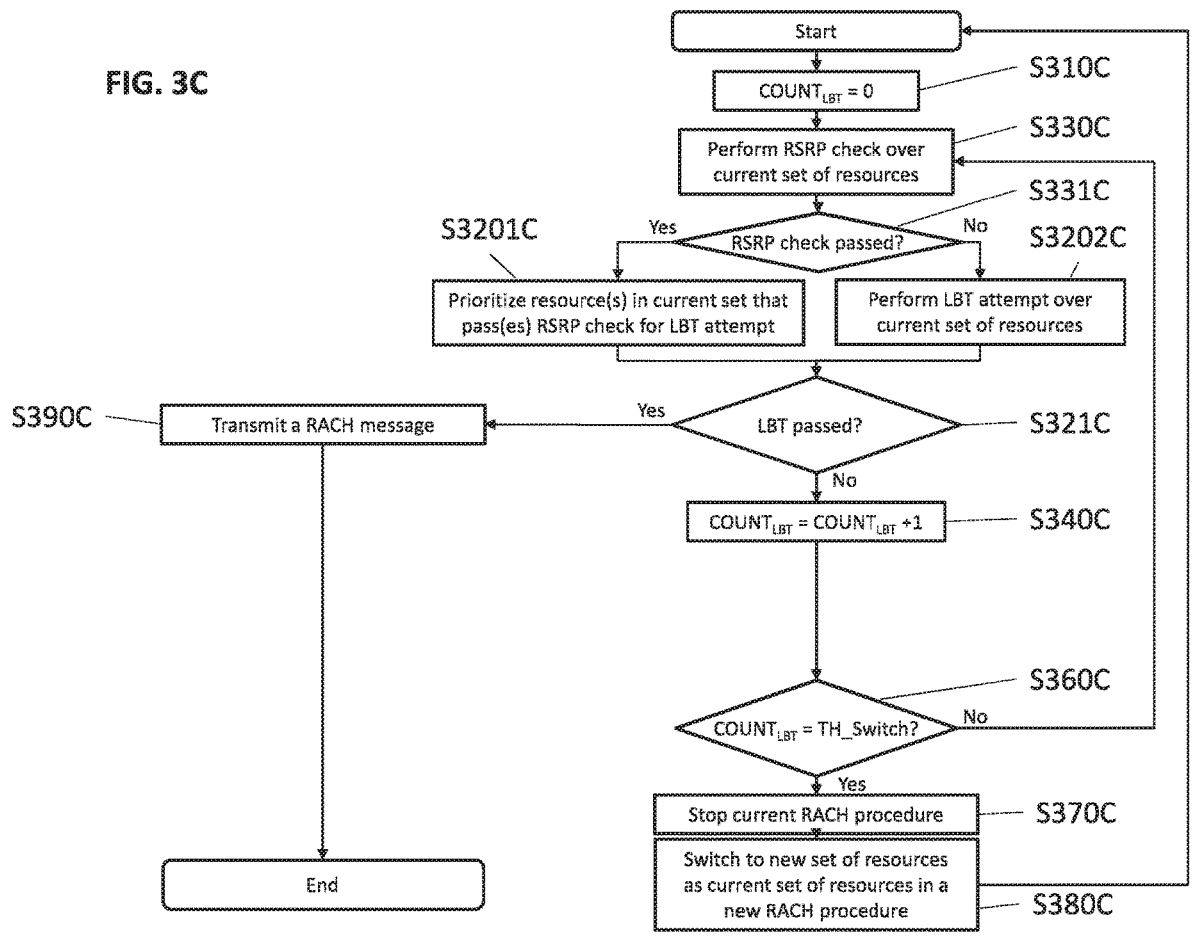

METHOD AND USER EQUIPMENT OF PERFORMING RESOURCE SWITCHING IN UNLICENSED SPECTRUM

CROSS-REFERENCE TO RELATED APPLICATIONS

This nonprovisional application claims priority under 35 U.S.C. § 119(e) on U.S. Provisional Patent Application No. 62/886,971, filed on Aug. 15, 2019, the entirety of which is incorporated herein by reference.

TECHNICAL FIELD

The present application relates to resource switching in an unlicensed spectrum.

BACKGROUND

Insufficient wireless frequency bands arise with the increase in mobile traffic demand, which results in increased cost of the licensed spectrum. Therefore, an unlicensed spectrum presents a potential opportunity for mobile services. However, interference caused by existing wireless transmissions, such as Wi-Fi in the unlicensed spectrum, is a serious issue in the effective utilization of the unlicensed spectrum. Listen Before Talk (LBT) was proposed as a promising method to ensure the coexistence of Wi-Fi and commercial mobile services such as LTE or 5G network.

LBT is a technique used in radio communications where a radio transmitter first senses its radio environment before it starts a transmission. LBT can be used by a radio device to find a free radio channel. In the 5G unlicensed spectrum, a successful LBT is needed before each transmission between the user equipment (UE) and the base station. For example, in the 5G unlicensed spectrum, if LBT fails, the transmission of a random access channel (RACH) message (e.g., preamble) cannot be performed. In addition, during the handover procedure, LBT failure before the UE synchronizes with the target base station (i.e., RACH preamble transmission) may lead to unsuccessful handover. Therefore, how to reduce the impact of LBT failure on transmissions between the UE and the base station in the unlicensed spectrum becomes an issue to address.

SUMMARY

According to a first aspect of the present application, a method of performing resource switching in an unlicensed spectrum is provided, wherein a current set of resources in the unlicensed spectrum is utilized by a UE for performing LBT attempts for transmission of an RACH message to a base station. The method includes: performing one or more LBT attempts for transmissions from the UE to the base station over the current set of resources during a current RACH procedure; and switching from the current set of resources to a new set of resources in the unlicensed spectrum to be utilized by the UE in a new RACH procedure after a failure count reaches a pre-configured threshold during the current RACH procedure, wherein the failure count is calculated at least based on a count of LBT failure over the current set of resources during the current RACH procedure.

Furthermore, according to a second aspect of the present application, a method of performing resource switching in an unlicensed spectrum is provided, wherein a current set of resources in the unlicensed spectrum is utilized by a UE for performing LBT attempts for transmission of an RACH message to a base station. The method includes: performing one or more LBT attempts for transmissions from the UE to the base station over the current set of resources during a current RACH procedure; and switching from the current set of resources to a new set of resources in the unlicensed spectrum to be utilized by the UE in a new RACH procedure after a count of LBT failure over the current set of resources reaches a pre-configured threshold during the current RACH procedure, wherein the count of LBT failure is increased by one (1) when a current LBT attempt over the current set of resources fails during the current RACH procedure.

Still furthermore, according to a third aspect of the present application, a method of performing resource switching in an unlicensed spectrum is provided, wherein a current set of resources in the unlicensed spectrum is utilized by a UE for performing LBT attempts for transmission of an RACH message to a base station. The method includes: performing one or more LBT attempts for transmissions from the UE to the base station over the current set of resources during a current RACH procedure; and performing a reference signal received power (RSRP) check over the current set of resources either after a current LBT attempt over the current set of resources passes, or before performing the current LBT attempt over the current set of resources, switching from the current set of resources to a new set of resources in the unlicensed spectrum to be utilized by the UE in a new RACH procedure after a failure count over the current set of resources reaches a pre-configured threshold during the current RACH procedure, wherein the failure count is increased by one (1) when either of the current LBT attempt and the RSRP check over the current set of resources fails during the current RACH procedure.

Still furthermore, according to a fourth aspect of the present application, a UE is provided, wherein a current set of resources in the unlicensed spectrum is utilized by the UE for performing LBT attempts for transmission of an RACH message to a base station. The UE includes a transceiver configured to transmit signals to the base station and receive signals from the base station; and a processor coupled to the transceiver and configured to: perform one or more LBT attempts for transmissions from the UE to the base station over the current set of resources during a current RACH procedure; and switch from the current set of resources to a new set of resources in the unlicensed spectrum to be utilized by the UE in a new RACH procedure after a failure count reaches a pre-configured threshold during the current RACH procedure, wherein the failure count is calculated at least based on a count of LBT failure over the current set of resources during the current RACH procedure.

Still furthermore, according to a fifth aspect of the present application, a UE is provided, wherein a current set of resources in the unlicensed spectrum is utilized by the UE for performing LBT attempts for transmission of an RACH message to a base station. The UE includes a transceiver configured to transmit signals to the base station and receive signals from the base station; and a processor coupled to the transceiver and configured to: perform one or more LBT attempts for transmissions from the UE to the base station over the current set of resources during a current RACH procedure; switch from the current set of resources to a new set of resources in the unlicensed spectrum to be utilized by the UE in a new RACH procedure after a count of LBT failure over the current set of resources reaches a pre-configured threshold during the current RACH procedure; and increase the count of LBT failure by one (1) when a current LBT attempt over the current set of resources fails during the current RACH procedure.

Still furthermore, according to a sixth aspect of the present application, a UE is provided, wherein a current set of resources in the unlicensed spectrum is utilized by the UE for performing LBT attempts for transmission of an RACH message to a base station. The UE includes a transceiver configured to transmit signals to the base station and receive signals from the base station; and a processor coupled to the transceiver and configured to: perform one or more LBT attempts for transmissions from the UE to the base station over the current set of resources during a current RACH procedure; perform a reference signal received power (RSRP) check over the current set of resources either after a current LBT attempt over the current set of resources passes, or before performing the current LBT attempt over the current set of resources; switch from the current set of resources to a new set of resources in the unlicensed spectrum to be utilized by the UE in a new RACH procedure after a failure count over the current set of resources reaches a pre-configured threshold during the current RACH procedure; and increase the failure count by one (1) when either of the current LBT attempt and the RSRP check over the current set of resources fails during the current RACH procedure.

Further scope of applicability of the present application will become apparent from the detailed description given hereinafter. However, it should be understood that the detailed description and specific examples, while indicating preferred embodiments of the application, are given by way of illustration only, since various changes and modifications within the spirit and scope of the invention will become apparent to those skilled in the art from this detailed description.

BRIEF DESCRIPTION OF THE DRAWINGS

The present application will become more fully understood from the detailed description given hereinbelow and the accompanying drawings which are given by way of illustration only, and thus are not limitative of the present application, and wherein:

FIGS. 3A-3C illustrate embodiments of a process of performing resource switching in an unlicensed spectrum as shown in FIG. 2A;

Figure 1:
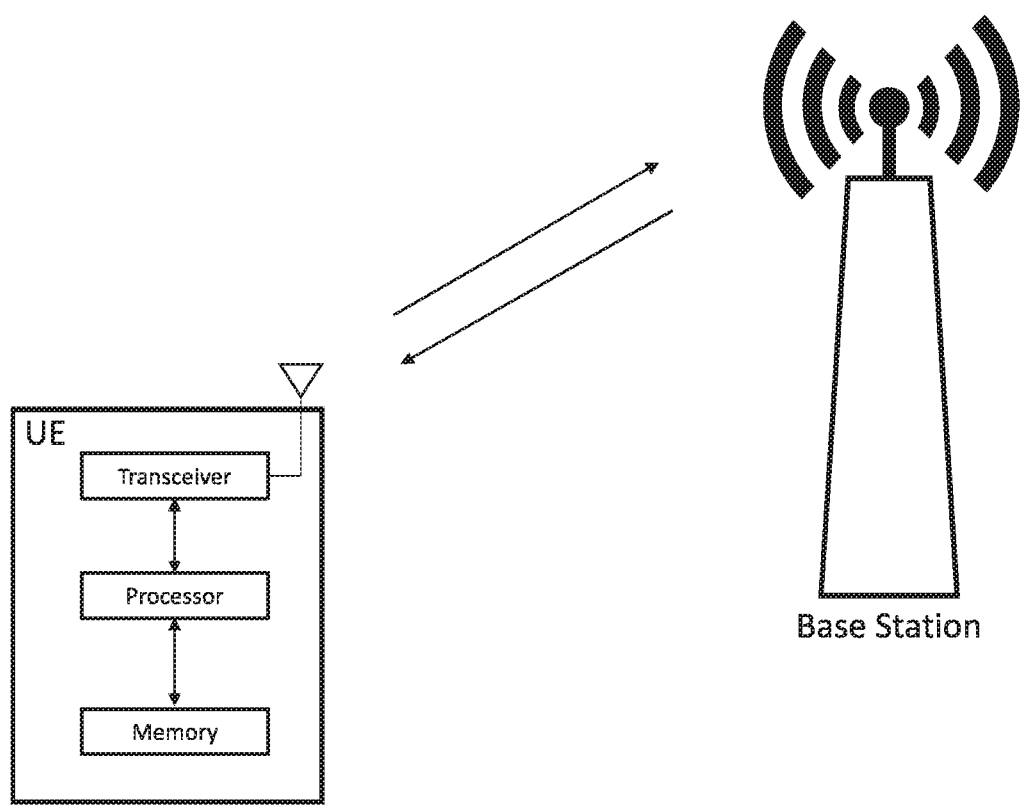
FIG. 1 illustrates a systemic view of a UE and a base station in accordance with an embodiment of the present application.

DETAILED DESCRIPTION OF THE
ILLUSTRATED EMBODIMENTS

The present application will now be described in detail with reference to the accompanying drawings, wherein the same reference numerals will be used to identify the same or similar elements throughout the several views. It should be noted that the drawings should be viewed in the direction of orientation of the reference numerals.

FIG. 1 illustrates a systemic view of a UE and a base station in accordance with an embodiment of the present application. As shown in FIG. 1, a UE includes a transceiver configured to transmit signals to a base station and/or receive signals from the base station, a processor coupled, e.g. directly connected or indirectly connected, to the transceiver, and a memory embedded in the processor or external to but coupled, e.g. directly connected or indirectly connected, to the processor for storing data and application to be used/saved/executed by the processor.

Figure 2:
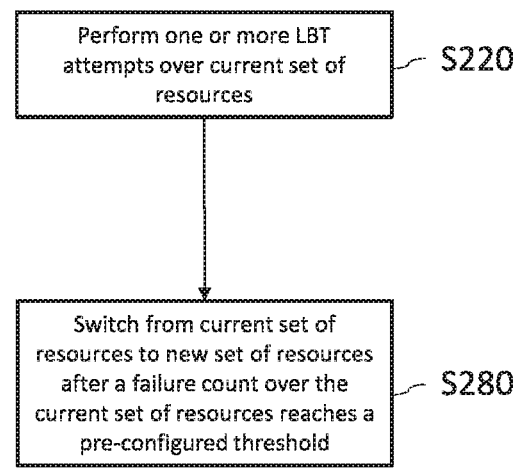
FIG. 2 illustrates a process of performing resource switching in an unlicensed spectrum in accordance with an embodiment of the present application.

FIG. 2 illustrates a process of performing resource switching in an unlicensed spectrum in accordance with an embodiment of the present application. In an embodiment, a current set of resources in the unlicensed spectrum is utilized by a UE for performing LBT attempts for transmission of an RACH message to a base station. As shown in FIG. 2, one or more LBT attempts for transmissions from the UE to the base station over the current set of resources are performed during a current RACH procedure (S220), and the current set of resources is switched to a new set of resources in the unlicensed spectrum to be utilized by the UE in a new RACH procedure after a failure count reaches a pre-configured threshold during the current RACH procedure (S280). In an embodiment, the failure count is calculated at least based on a count of LBT failure over the current set of resources during the current RACH procedure.

In an embodiment, a plurality of sets of resources (including the current set and the new set) are configured to be utilized by the UE for performing the LBT attempts for transmission of the RACH message to the base station.

In an embodiment, each set of resources may include the following set or subset of resources: one or more RACH resources from dedicated RACH resources, one or more RACH resources from common RACH resources, one or more RACH resources from dedicated RACH resources and common RACH resources, one or more physical random access channel (PRACH) occasions (ROs), one or more sub-bands, one or more bandwidth parts (BWPs), etc. Therefore, in an embodiment, the resource switching from the current set to the new set can be made by switching from any one of the above-noted sets or subsets of resources to another one of the above-noted sets or subsets of resources, as long as the unit of the resources in the current set and the unit of the resources in the new set are compatible with each other. For example, the resource switching from the current set to the new set can be made by switching from one or more RACH resources from the dedicated RACH resources (the current set) to a different one or a different combination of RACH resources from the dedicated RACH resources (the new set), or to one or more RACH resources from the common RACH resources (the new set), or to one or more RACH resources from the dedicated RACH resources and common RACH resources (the new set), switching from one or more RACH resources from the common RACH resources (the current set) to a different one or a different combination of RACH resources from the common RACH resources (the new set), or to one or more RACH resources from the dedicated RACH resources (the new set), or to one or more RACH resources from the dedicated RACH resources and common RACH resources (the new set), switching from one or more RACH resources from the dedicated RACH resources and common RACH resources (the current set) to a different one or a different combination of RACH resources from the dedicated RACH resources and common RACH resources (the new set), switching from one or more ROs (the current set) to a different one or a different combination of ROs (the new set), switching from one or more BWPs (the current set) to a different one or a different combination of BWPs (the new set), or switching from one or more sub-bands (the current set) to a different one or a different combination of sub-bands (the new set), etc. In addition, as long as a set of resources has a different combination of resources from another set of resources, they are considered as different sets of resources (even if some of the resources in both sets are common).

In addition, dedicated RACH resources are contention-free random access resources associated with synchronization signal blocks (SSBs) and/or channel state information reference signals (CSI-RSs); common RACH resources are contention-based random access resources associated with SSBs; ROs are time-frequency resources configured to UE as preamble transmission opportunities; a BWP may include one or more sub-bands.

Figure 2A:
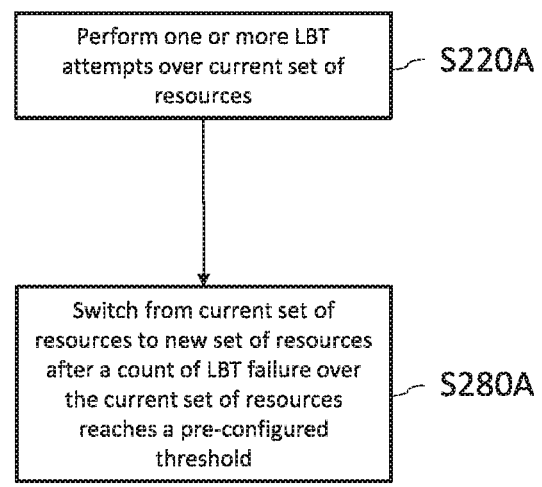
FIG. 2A illustrates an embodiment of a process of performing resource switching in an unlicensed spectrum as shown in FIG. 2.

FIG. 2A illustrates an embodiment of a process of performing resource switching in an unlicensed spectrum as shown in FIG. 2.

As shown in FIG. 2A, one or more LBT attempts for transmissions from the UE to the base station over the current set of resources are performed during a current RACH procedure (S220A), and the current set of resources is switched to a new set of resources in the unlicensed spectrum to be utilized by the UE in a new RACH procedure after a count of LBT failure over the current set of resources reaches a pre-configured threshold during the current RACH procedure (S280A). In an embodiment, the count of LBT failure is increased by one (1) when a current LBT attempt over the current set of resources fails during the current RACH procedure.

In an embodiment, the current set of resources is a BWP consisting of several sub-bands, and an LBT attempt over the current set of resources passes if the BWP does not encounter LBT failure; i.e. all sub-bands in the BWP pass LBT. Otherwise, the LBT attempt over the current set of resources fails. For example, if the current set of resource is BWP1 consisting of sub-bands SB1, SB2 and SB3, the LBT attempt over the current set of resources is deemed to pass only if all of the sub-bands SB1, SB2 and SB3 pass LBT. However, if the sub-band SB1 fails LBT (no matter whether the sub-bands SB2 and SB3 pass or not), then the LBT attempt over the current set of resources is deemed to fail. In another embodiment, the current set of resources include a plurality of sub-bands in several BWPs, and an LBT attempt over the current set of resources passes if there exists at least one BWP which is (partially) contained in the current set of resources does not encounter LBT failure. Otherwise, the LBT attempt over the current set of resources fails. It should be noted that these are embodiments of how to determine whether the LBT attempt over the current set of resources passes or fails. In another embodiment, an LBT attempt over the current set of resources may be deemed to pass as long as any one of the resources (e.g., sub-bands) in the current set of resources passes LBT, and it does not consider the resources in the same group (e.g., the same BWP) as a whole when determining whether the LBT attempt passes or fails.

In an embodiment, the count of LBT failure is initialized to zero (0) before performing a first LBT attempt over the current set of resources during the current RACH procedure.

In an embodiment, the current RACH procedure is stopped after the count of LBT failure reaches the pre-configured threshold but before switching from the current set of resources to the new set of resources.

In an embodiment, after stopping the current RACH procedure and switching from the current set of resources to the new set of resources, the count of LBT failure is reset to zero (0), and the new set of resources is used as the new current set of resources to be utilized by the UE for performing the LBT attempts for transmission of a random access channel (RACH) message to the base station in the new RACH procedure (which becomes the new current RACH procedure).

Figure 2B:
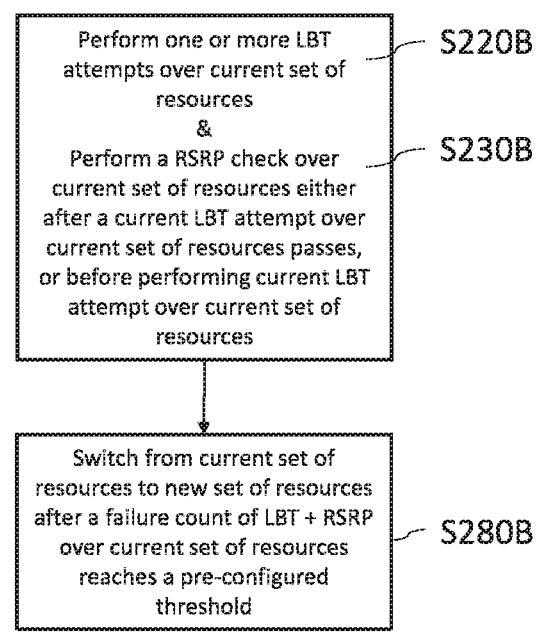
FIG. 2B illustrates another embodiment of a process of performing resource switching in an unlicensed spectrum as shown in FIG. 2.

FIG. 2B illustrates another embodiment of a process of performing resource switching in an unlicensed spectrum as shown in FIG. 2.

As shown in FIG. 2B, one or more LBT attempts for transmissions from the UE to the base station over the current set of resources are performed during a current RACH procedure (S220B), and a reference signal received power (RSRP) check over the current set of resources is performed either after a current LBT attempt over the current set of resources passes, or before performing the current LBT attempt over the current set of resources (S230B), and the current set of resources is switched to a new set of resources in the unlicensed spectrum to be utilized by the UE in a new RACH procedure after a failure count over the current set of resources reaches a pre-configured threshold during the current RACH procedure (S280B). In an embodiment, the failure count is calculated at least based on either of the current LBT attempt and the RSRP check over the current set of resources fails during the current RACH procedure. In an embodiment, the failure count is increased by one (1) when either of the current LBT attempt and the RSRP check over the current set of resources fails during the current RACH procedure.

In an embodiment, the current set of resources is a BWP consisting of several sub-bands, and an LBT attempt over the current set of resources passes if the BWP does not encounter LBT failure; i.e. all sub-bands in the BWP pass LBT. Otherwise, the LBT attempt over the current set of resources fails. For example, if the current set of resource is BWP1 consisting of sub-bands SB1, SB2 and SB3, the LBT attempt over the current set of resources is deemed to pass only if all of the sub-bands SB1, SB2 and SB3 pass LBT. However, if the sub-band SB1 fails LBT (no matter whether the sub-bands SB2 and SB3 pass or not), then the LBT attempt over the current set of resources is deemed to fail. In another embodiment, the current set of resources include a plurality of sub-bands in several BWPs, and an LBT attempt over the current set of resources passes if there exists at least one BWP which is (partially) contained in the current set of resources does not encounter LBT failure. Otherwise, the LBT attempt over the current set of resources fails. It should be noted that these are embodiments of how to determine whether the LBT attempt over the current set of resources passes or fails. In another embodiment, an LBT attempt over the current set of resources may be deemed to pass as long as any one of the resources (e.g., sub-bands) in the current set of resources passes LBT, and it does not consider the resources in the same group (e.g., the same BWP) as a whole when determining whether the LBT attempt passes or fails.

In an embodiment, the current set of resources is a BWP configured with RACH resources associated with reference signals, i.e. synchronization signal blocks (SSBs) or channel state information reference signals (CSI-RSs), and an RSRP check over the current set of resources passes if at least one reference signal with RSRP above a pre-configured RSRP threshold amongst the associated reference signals is available. Otherwise, the RSRP check over the current set of resources fails. In another embodiment, the current set of resources include a plurality of sub-bands containing RACH resources associated with reference signals, and an RSRP check over the current set of resources passes if at least one reference signal with RSRP above a pre-configured RSRP threshold amongst the associated reference signals is available. Otherwise, the RSRP check over the current set of resources fails.

In an embodiment, the failure count is initialized to zero (0) before performing any of a first LBT attempt and a first RSRP check over the current set of resources during the current RACH procedure.

In an embodiment, the current RACH procedure is stopped after the failure count reaches the pre-configured threshold but before switching from the current set of resources to the new set of resources.

In an embodiment, after stopping the current RACH procedure and switching from the current set of resources to the new set of resources, the failure count is reset to zero (0), and the new set of resources is used as the new current set of resources to be utilized by the UE for performing the LBT attempts for transmission of a random access channel (RACH) message to the base station in the new RACH procedure (which becomes the new current RACH procedure).

Figure 3A:
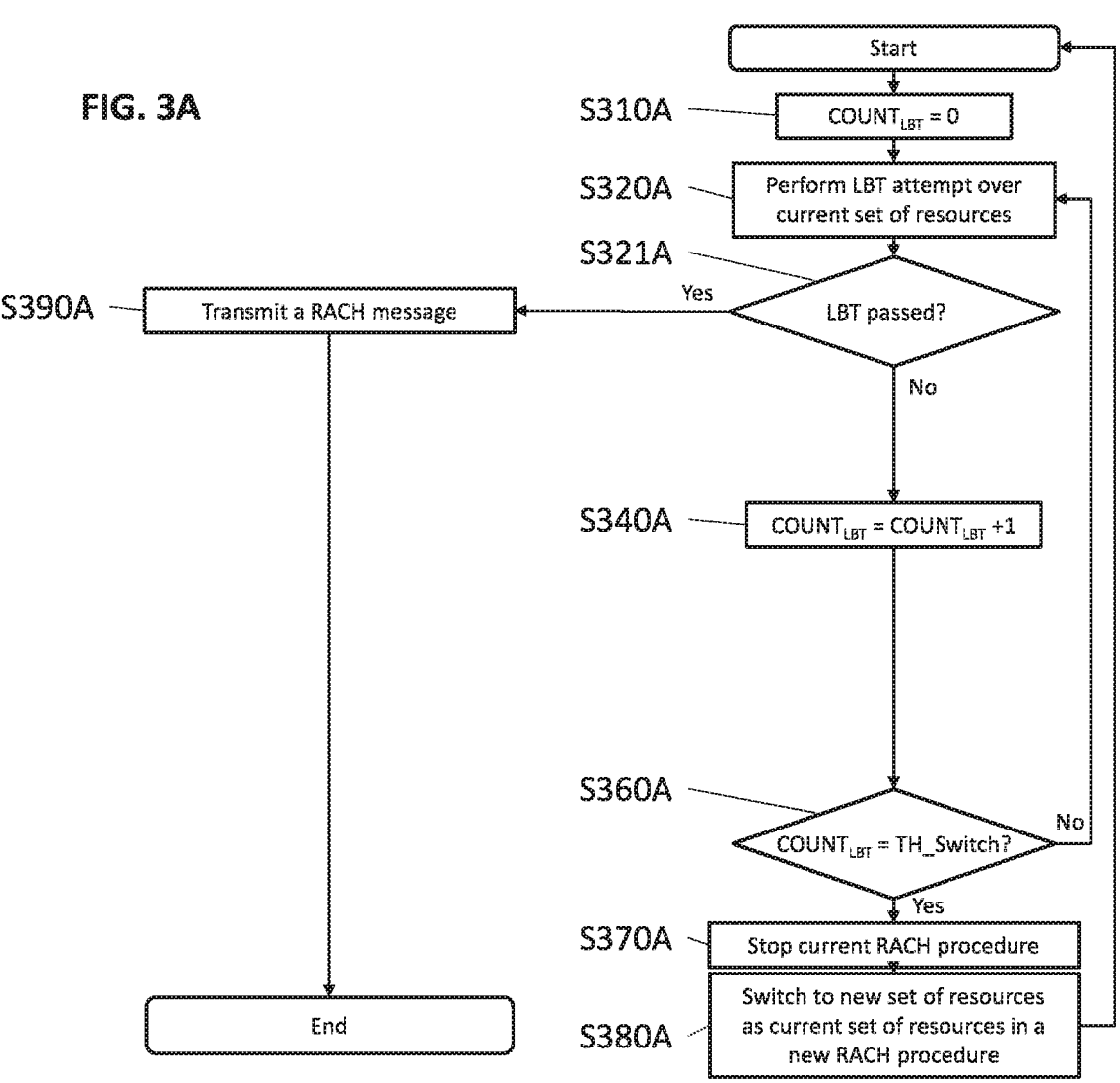

FIG. 3A illustrates an embodiment of performing resource switching in an unlicensed spectrum as shown in FIG. 2A.

In an embodiment shown in FIG. 3A, the count of LBT failure COUNTLBT is initialized to zero (0) (S310A) before performing a first LBT attempt over the current set of resources during the current RACH procedure (S320A).

After initializing the count of LBT failure COUNTLBT to zero (0), one or more LBT attempts for transmissions from the UE to the base station over the current set of resources are performed during a current RACH procedure (S320A). When the current LBT attempt over the current set of resources passes (S321A, YES) during the current RACH procedure and before the count of LBT failure COUNTLBT over the current set of resources reaches a pre-configured threshold TH_Switch, one of the resource(s) of the current set of resources that passes the current LBT attempt is used to transmit the RACH message (S390A).

However, when a current LBT attempt over the current set of resources fails during the current RACH procedure (S321A, NO), the count of LBT failure COUNTLBT is increased by one (1) (S340A). If the count of LBT failure COUNTLBT has not reached the pre-configured threshold TH_Switch (S360A, NO), the process goes back to S320A to perform a subsequent LBT attempt over the current set of resources. If the count of LBT failure COUNTLBT reaches the pre-configured threshold TH_Switch (S360A, YES), then the current RACH procedure is stopped (S370A, YES). After stopping the current RACH procedure, the current set of resources is switched to a new set of resources in the unlicensed spectrum to be utilized by the UE in a new RACH procedure (S380A). In other words, the current set of resources is switched to the new set of resources in the unlicensed spectrum to be utilized by the UE in a new RACH procedure after the count of LBT failure COUNTLBT over the current set of resources reaches the pre-configured threshold TH_Switch during the current RACH procedure.

After stopping the current RACH procedure and switching from the current set of resources to the new set of resources, a new RACH procedure is initiated, and the count of LBT failure COUNTLBT will be reset/initialized to zero (0) (e.g., S310A in FIG. 3A). In the new RACH procedure, the new set of resources is utilized by the UE for performing LBT attempts for transmission of an RACH message to the base station. In other words, the new set of resources will become the new "current" set of resources in the new "current" RACH procedure.

In an embodiment, the UE will run the same process shown in FIG. 3A for the new "current" RACH procedure (the feedback path in FIG. 3A). In another embodiment, the UE will run a different process shown in any one of FIGS. 3B-3E (explained below) for the new "current" RACH procedure. In other words, although FIG. 3A shows a feedback path from S380A back to the start point of the same process, the feedback path can also go to the start point of any of the processes in FIGS. 3A-3E for the subsequent "current" RACH procedure.

In an embodiment, the resource switching from a current set of resources (utilized in the current RACH procedure) to a new set of resources (to be utilized in a subsequent current RACH procedure) can be performed for more than once. For example, after switching from the current set of resources to a new set of resource, the new set of resources is utilized as the new "current" set of resources in a new "current" RACH procedure (and the count of LBT failure COUNTLBT will be reset/initialized to zero (0)). If the count of LBT failure COUNTLBT again reaches the pre-configured threshold TH_Switch during the new "current" RACH procedure, the new "current" set of resources currently utilized in the new "current" RACH procedure will be again switched to another set of resources to be utilized by the UE in a subsequent "current" RACH procedure. On the other hand, if an LBT attempt passes before the count of LBT failure COUNTLBT reaches the pre-configured threshold TH_Switch during the new "current" RACH procedure, one of the resource(s) of the new "current" set of resources that passes the current LBT attempt is used to transmit the RACH message.

In this embodiment, a dynamic resource switching scheme based on the count of LBT failure is utilized to change the resources used by the UE for performing LBT attempts for transmission of the RACH message to the base station, so as to reduce the impact of the LBT failure onto the RACH procedures between the UE and the base station, thereby increasing the chance of completing RACH procedure and/or handover procedure.

Figure 3B:
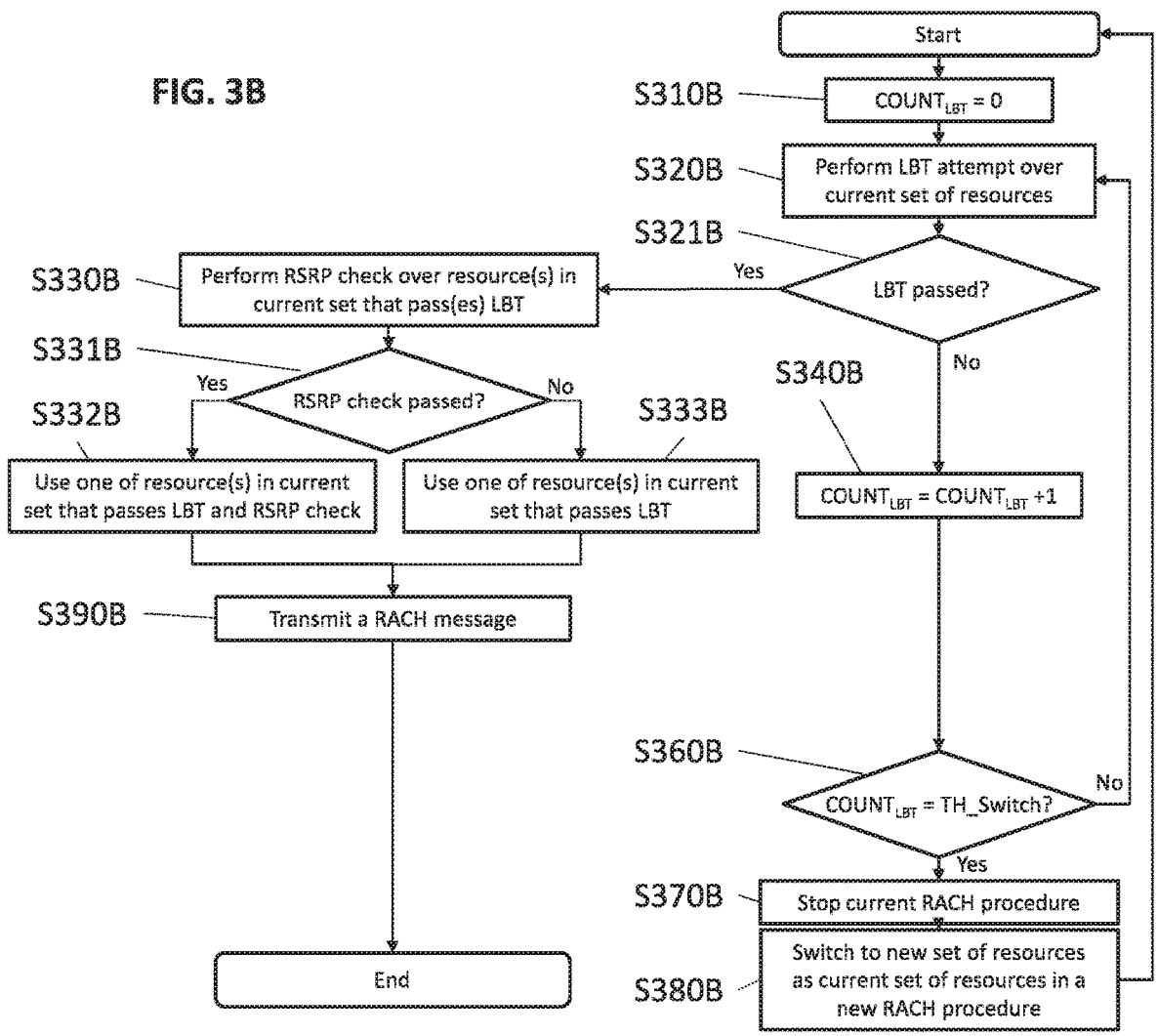

FIG. 3B illustrates another embodiment of performing resource switching in an unlicensed spectrum as shown in FIG. 2A.

In an embodiment shown in FIG. 3B, the count of LBT failure COUNTLBT is initialized to zero (0) (S310B) before performing a first LBT attempt over the current set of resources during the current RACH procedure (S320B).

After initializing the count of LBT failure COUNTLBT to zero (0), one or more LBT attempts for transmissions from the UE to the base station over the current set of resources are performed during a current RACH procedure (S320B). When the current LBT attempt over the current set of resources passes (S321B, YES) during the current RACH procedure and before the count of LBT failure COUNTLBT over the current set of resources reaches a pre-configured threshold TH_Switch, a reference signal received power (RSRP) check is performed over the resource(s) of the current set of resources that pass(es) the current LBT attempt (S330B).

When the RSRP check over the resource(s) of the current set of resources that pass(es) the current LBT attempt passes (S331B, YES), one of the resource(s) of the current set of resources that passes both the current LBT attempt and the RSRP check is used to transmit the RACH message (S332B & S390B). When the RSRP check over the resource(s) of the current set of resources that pass(es) the current LBT attempt fails (S331B, NO), one of the resource(s) of the current set of resources that passes the current LBT attempt is used to transmit the RACH message (S333B & 390B).

However, when a current LBT attempt over the current set of resources fails during the current RACH procedure (S321B, NO), the count of LBT failure COUNTLBT is increased by one (1) (S340B). If the count of LBT failure COUNTLBT has not reached the pre-configured threshold TH_Switch (S360B, NO), the process goes back to S320B to perform a subsequent LBT attempt over the current set of resources. If the count of LBT failure COUNTLBT reaches the pre-configured threshold TH_Switch (S360B, YES), then the current RACH procedure is stopped (S370B). After stopping the current RACH procedure, the current set of resources is switched to a new set of resources in the unlicensed spectrum to be utilized by the UE in a new RACH procedure (S380B). In other words, the current set of resources is switched to the new set of resources in the unlicensed spectrum to be utilized by the UE in a new RACH procedure after the count of LBT failure COUNTLBT over the current set of resources reaches the pre-configured threshold TH_Switch during the current RACH procedure.

After stopping the current RACH procedure and switching from the current set of resources to the new set of resources, a new RACH procedure is initiated, and the count of LBT failure COUNTLBT will be reset/initialized to zero (0) (e.g., S310B in FIG. 3B). In the new RACH procedure, the new set of resources is utilized by the UE for performing LBT attempts for transmission of an RACH message to the base station. In other words, the new set of resources will become the new "current" set of resources in the new "current" RACH procedure.

In an embodiment, the UE will run the same process shown in FIG. 3B for the new "current" RACH procedure (the feedback path in FIG. 3B). In another embodiment, the UE will run a different process shown in any one of FIG. 3A (explained above) and 3C-3E (explained below) for the new "current" RACH procedure. In other words, although FIG. 3B shows a feedback path from S380B back to the start point of the same process, the feedback path can also go to the start point of any of the processes in FIGS. 3A-3E for the subsequent "current" RACH procedure.

In an embodiment, the resource switching from a current set of resources (utilized in the current RACH procedure) to a new set of resources (to be utilized in a subsequent current RACH procedure) can be performed for more than once. For example, after switching from the current set of resources to a new set of resource, the new set of resources is utilized as the new "current" set of resources in a new "current" RACH procedure (and the count of LBT failure COUNTLBT will be reset/initialized to zero (0)). If the count of LBT failure COUNTLBT again reaches the pre-configured threshold TH_Switch during the new "current" RACH procedure, the new "current" set of resources currently utilized in the new "current" RACH procedure will be again switched to another set of resources to be utilized by the UE in a subsequent "current" RACH procedure. On the other hand, if an LBT attempt passes before the count of LBT failure COUNTLBT reaches the pre-configured threshold TH_Switch during the new "current" RACH procedure, one of the resource(s) of the new "current" set of resources that passes the current LBT attempt is used to transmit the RACH message.

In this embodiment, a dynamic resource switching scheme based on the count of LBT failure is utilized to change the resources used by the UE for performing LBT attempts for transmission of the RACH message to the base station, so as to reduce the impact of the LBT failure onto the RACH procedures between the UE and the base station, thereby increasing the chance of completing RACH procedure and/or handover procedure. In addition, in this embodiment, the result of the RSRP check is further considered to choose a better resource to transmit the RACH message. In particular, the UE will choose one of the resource(s) that pass(es) both the LBT attempt and the RSRP check (because these resources have stronger signal strength than those who fail to pass the RSRP check), if such resource(s) is/are available, to transmit the RACH message; if such resource(s) is/are not available, then the UE will choose one of the resource(s) that pass(es) the LBT attempt to transmit the RACH message. This would allow the UE to use the resources with stronger signal strength to transmit the RACH message.

FIG. 3C illustrates another embodiment of performing resource switching in an unlicensed spectrum as shown in FIG. 2A.

In an embodiment shown in FIG. 3C, the count of LBT failure COUNTLBT is initialized to zero (0) (S310C) before performing a first LBT attempt over the current set of resources during the current RACH procedure (S3201C & S3202C) (and before performing an RSRP check over the current set of resources during the current RACH procedure (S330C)).

After initializing the count of LBT failure COUNTLBT to zero (0), and before performing each of the one or more LBT attempts over the current set of resources, an RSRP check is performed over the current set of resources (S330C).

When the RSRP check over the current set of resources passes (S331C, YES), a current LBT attempt is performed over the resource(s) of the current set of resources that pass(es) the RSRP check (S3201C). When the current LBT attempt over the resource(s) of the current set of resources that pass(es) the RSRP check passes (S321C, YES), one of the resource(s) of the current set of resources that passes both the RSRP check and the current LBT attempt is used to transmit the RACH message (S390C).

However, when the current LBT attempt over the resource(s) of the current set of resources that pass(es) the RSRP check fails (S3201C), the current LBT attempt is then further performed over the resource(s) of the current set of resources that fail(s) to pass the RSRP check (S3201C). When the current LBT attempt over the resource(s) of the current set of resources that pass(es) the RSRP check fails, but the current LBT attempt over the resource(s) of the current set of resources that fail(s) to pass the RSRP check passes (S321C, YES), one of the resource(s) of the current set of resources that fails to pass the RSRP check but passes the current LBT attempt is used to transmit the RACH message (S390C).

On the other hand, when the RSRP check over the current set of resources fails (S331C, NO), a current LBT attempt is performed over the resource(s) of the current set of resources (that fail(s) the RSRP check) (S3202C). When the RSRP check over the current set of resources fails (S331C, NO), but the current LBT attempt over the resource(s) of the current set of resources passes (S321C, YES), one of the resource(s) of the current set of resources that passes the current LBT attempt is used to transmit the RACH message (S390C).

However, when a current LBT attempt over the current set of resources fails during the current RACH procedure (S321C, NO), the count of LBT failure COUNTLBT is increased by one (1) (S340C). If the count of LBT failure COUNTLBT has not reached the pre-configured threshold TH_Switch (S360C, NO), the process goes back to S330C to perform a subsequent RSRP check over the current set of resources. If the count of LBT failure COUNTLBT reaches the pre-configured threshold TH_Switch (S360C, YES), then the current RACH procedure is stopped (S370C, YES). After stopping the current RACH procedure, the current set of resources is switched to a new set of resources in the unlicensed spectrum to be utilized by the UE in a new RACH procedure. In other words, the current set of resources is switched to the new set of resources in the unlicensed spectrum to be utilized by the UE in a new RACH procedure after the count of LBT failure COUNTLBT over the current set of resources reaches the pre-configured threshold TH_Switch during the current RACH procedure.

After stopping the current RACH procedure and switching from the current set of resources to the new set of resources, a new RACH procedure is initiated, and the count of LBT failure COUNTLBT will be reset/initialized to zero (0) (e.g., S310C in FIG. 3C). In the new RACH procedure, the new set of resources is utilized by the UE for performing LBT attempts for transmission of an RACH message to the base station (S380C). In other words, the new set of resources will become the new "current" set of resources in the new "current" RACH procedure.

In an embodiment, the UE will run the same process shown in FIG. 3C for the new "current" RACH procedure (the feedback path in FIG. 3C). In another embodiment, the UE will run a different process shown in any one of FIGS. 3A, 3B (explained above), 3D and 3E (explained below) for the new "current" RACH procedure. In other words, although FIG. 3C shows a feedback path from S380C back to the start point of the same process, the feedback path can also go to the start point of any of the processes in FIGS. 3A-3E for the subsequent "current" RACH procedure.

In an embodiment, the resource switching from a current set of resources (utilized in the current RACH procedure) to a new set of resources (to be utilized in a subsequent current RACH procedure) can be performed for more than once. For example, after switching from the current set of resources to a new set of resource, the new set of resources is utilized as the new "current" set of resources in a new "current" RACH procedure (and the count of LBT failure COUNTLBT will be reset/initialized to zero (0)). If the count of LBT failure COUNTLBT again reaches the pre-configured threshold TH_Switch during the new "current" RACH procedure, the new "current" set of resources currently utilized in the new "current" RACH procedure will be again switched to another set of resources to be utilized by the UE in a subsequent "current" RACH procedure. On the other hand, if an LBT attempt passes before the count of LBT failure COUNTLBT reaches the pre-configured threshold TH_Switch during the new "current" RACH procedure, one of the resource(s) of the new "current" set of resources that passes the current LBT attempt is used to transmit the RACH message.

In this embodiment, a dynamic resource switching scheme based on the count of LBT failure is utilized to change the resources used by the UE for performing LBT attempts for transmission of the RACH message to the base station, so as to reduce the impact of the LBT failure onto the RACH procedures between the UE and the base station, thereby increasing the chance of completing RACH procedure and/or handover procedure. In addition, in this embodiment, the RSRP check is performed before the LBT attempt, and the result of the RSRP check is used to prioritize the order of the resources for performing the LBT attempt thereover. In particular, the LBT attempt is performed over the resources passing the RSRP check (i.e., the resources with stronger signal strength) prior to over the resources failing the RSRP check (i.e., the resources with weaker signal strength). If the LBT attempt over the resources passing the RSRP check passes, one of the resource(s) passing both the RSRP check and the LBT attempt will be used to transmit the RACH message, and there is no need to perform the LBT attempt over the resources failing the RSRP check. If the LBT attempt over the resources passing the RSRP check fails, then the LBT attempt is performed over the resources failing the RSRP check, and if the LBT attempt over the resources failing the RSRP check passes, one of the resource(s) failing the RSRP check but passing the LBT attempt will be used to transmit the RACH message. However, if the RSRP check over the current set of resources fails, then the LBT attempt is still performed over the current set of resources (i.e., the resources failing the RSRP check), and if the LBT attempt over the current set of resources passes, one of the resource(s) failing the RSRP check but passing the LBT attempt will be used to transmit the RACH message. The uses of the result of the RSRP check to prioritize the order of the resources for performing the LBT attempt thereover makes the process more efficient, because it may not be necessary to perform the LBT attempt over some of the resources when some other resources with higher priority are qualified for transmitting the RACH message.

Figure 3D:
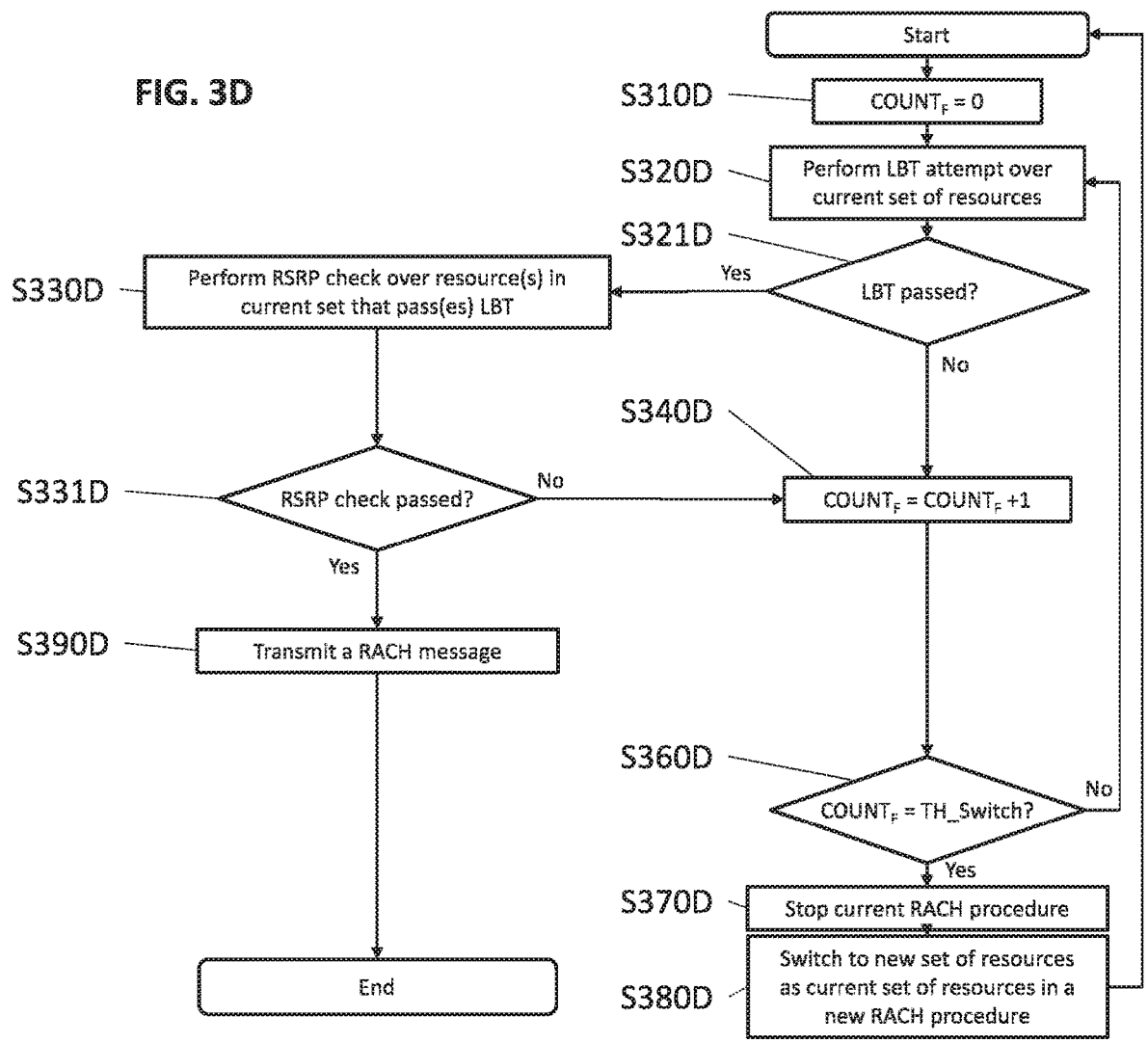
FIGS. 3D-3E illustrate embodiments of a process of performing resource switching in an unlicensed spectrum as shown in FIG. 2B.

FIG. 3D illustrates an embodiment of performing resource switching in an unlicensed spectrum as shown in FIG. 2B.

In an embodiment shown in FIG. 3D, the failure count $COUNT_F$ is initialized to zero (0) (S310D) before performing a first LBT attempt over the current set of resources during the current RACH procedure (S320D).

After initializing the failure count $COUNT_F$ to zero (0), one or more LBT attempts for transmissions from the UE to the base station over the current set of resources are performed during a current RACH procedure (S320D). When the current LBT attempt over the current set of resources passes (S321D, YES) during the current RACH procedure, an RSRP check is performed over the resource(s) of the current set of resources that pass(es) the current LBT attempt (S330D).

When the RSRP check over the resource(s) of the current set of resources that pass(es) the current LBT attempt passes (S331D, YES), one of the resource(s) of the current set of resources that passes both the current LBT attempt and the RSRP check is used to transmit the RACH message (S390D). When the RSRP check over the resource(s) of the current set of resources that pass(es) the current LBT attempt fails (S331B, NO), the failure count is increase by one (1) (S340D), and no RACH message will be transmitted using the resource(s) of the current set of resources that pass(es) the current LBT attempt but fail(s) to pass the RSRP check, although there is/are resource(s) of the current set of resources that pass(es) the current LBT attempt. If the failure count $COUNT_F$ has not reached the pre-configured threshold TH_Switch (S360D, NO), the process goes back to S320D to perform a subsequent LBT attempt over the current set of resources. If the failure count $COUNT_F$ reaches the pre-configured threshold TH_Switch (S360D, YES), then the current RACH procedure is stopped (S370D).

On the other hand, when the current LBT attempt over the current set of resources fails (S321D, NO) during the current RACH procedure, the failure count is increase by one (1) (S340D). If the failure count $COUNT_F$ has not reached the pre-configured threshold TH_Switch (S360D, NO), the process goes back to S320D to perform a subsequent LBT attempt over the current set of resources. If the failure count $COUNT_F$ reaches the pre-configured threshold TH_Switch (S360D, YES), then the current RACH procedure is stopped (S370D).

After stopping the current RACH procedure, the current set of resources is switched to a new set of resources in the unlicensed spectrum to be utilized by the UE in a new RACH procedure (S380D). In other words, the current set of resources is switched to the new set of resources in the unlicensed spectrum to be utilized by the UE in a new RACH procedure after the failure count $COUNT_F$ over the current set of resources reaches the pre-configured threshold TH_Switch during the current RACH procedure.

After stopping the current RACH procedure and switching from the current set of resources to the new set of resources, a new RACH procedure is initiated, and the failure count $COUNT_F$ will be reset/initialized to zero (0) (e.g., S310D in FIG. 3D). In the new RACH procedure, the new set of resources is utilized by the UE for performing LBT attempts for transmission of an RACH message to the base station. In other words, the new set of resources will become the new "current" set of resources in the new "current" RACH procedure.

In an embodiment, the UE will run the same process shown in FIG. 3D for the new "current" RACH procedure (the feedback path in FIG. 3D). In another embodiment, the UE will run a different process shown in any one of FIGS. 3A-3C (explained above) and 3E (explained below) for the new "current" RACH procedure. In other words, although FIG. 3D shows a feedback path from S380D back to the start point of the same process, the feedback path can also go to the start point of any of the processes in FIGS. 3A-3E for the subsequent "current" RACH procedure.

In an embodiment, the resource switching from a current set of resources (utilized in the current RACH procedure) to a new set of resources (to be utilized in a subsequent current RACH procedure) can be performed for more than once. For example, after switching from the current set of resources to a new set of resource, the new set of resources is utilized as the new "current" set of resources in a new "current" RACH procedure (and the failure count $COUNT_F$ will be reset/initialized to zero (0)). If the failure count $COUNT_F$ again reaches the pre-configured threshold TH_Switch during the new "current" RACH procedure, the new "current" set of resources currently utilized in the new "current" RACH procedure will be again switched to another set of resources to be utilized by the UE in a subsequent "current" RACH procedure. On the other hand, if both an LBT attempt and an RSRP check pass before the failure count $COUNT_F$ reaches the pre-configured threshold TH_Switch during the new "current" RACH procedure, one of the resource(s) of the new "current" set of resources that passes both the current LBT attempt and RSRP check is used to transmit the RACH message.

In this embodiment, a dynamic resource switching scheme based on the failure count is utilized to change the resources used by the UE for performing LBT attempts for transmission of the RACH message to the base station, so as to reduce the impact of the LBT failure onto the RACH procedures between the UE and the base station, thereby increasing the chance of completing RACH procedure and/or handover procedure. In this embodiment, not only the LBT failure but also the RSRP failure will be counted toward the failure count $COUNT_F$ for resource switching. In other words, the failure count is increased by one (1) when either of the current LBT attempt and the RSRP check over the current set of resources fails during the current RACH procedure. In this embodiment, the UE will transmits the RACH message only when both the current LBT attempt and the RSRP check over the current set of resources pass, and one of the resource(s) of the current set of resources that passes both the current LBT attempt and RSRP check is used to transmit the RACH message. This would enhance transmission quality of the RACH message by using a resource that passes the LBT attempt and also has stronger signal strength (i.e., passing the RSRP check).

Figure 3E:
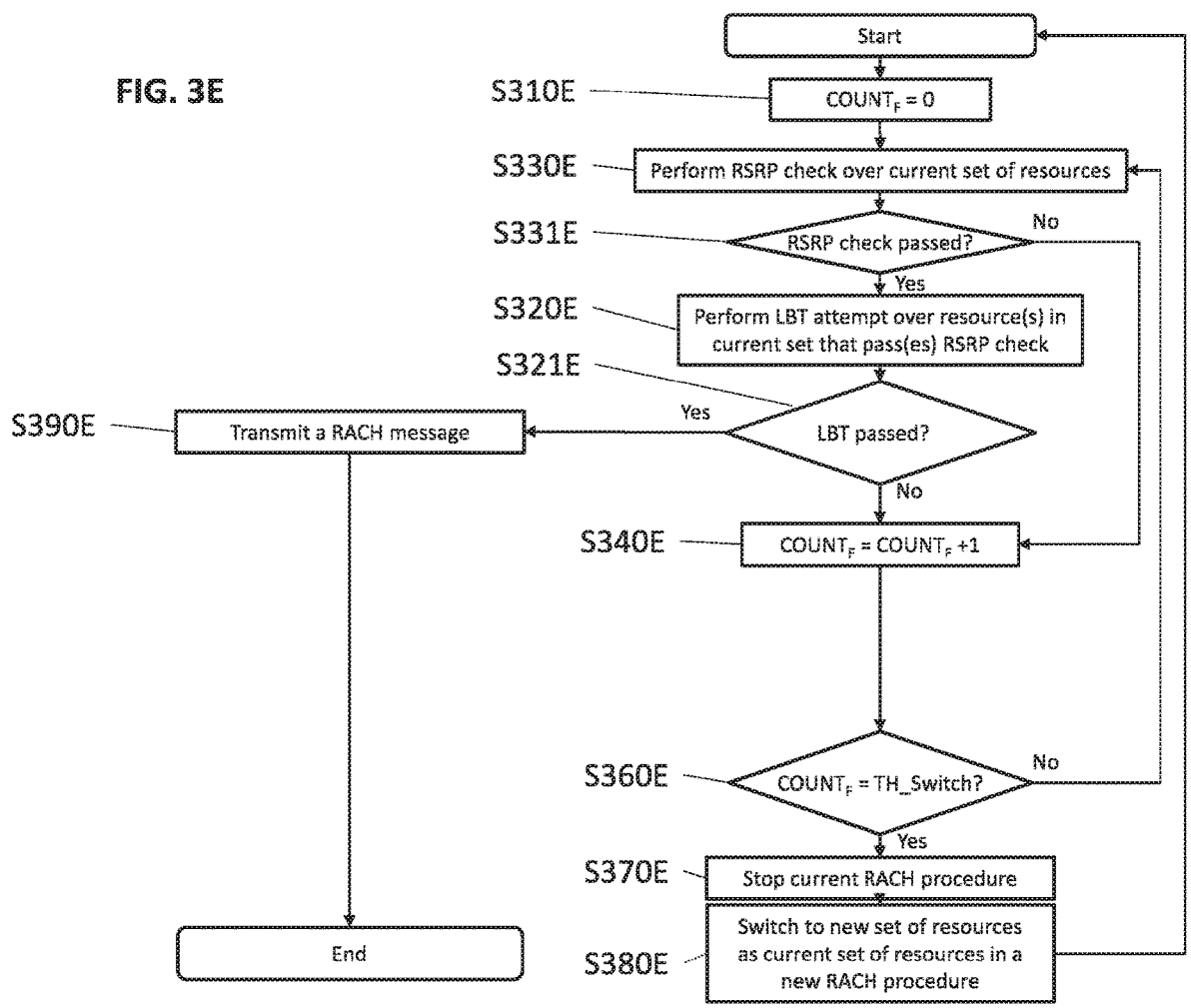

FIG. 3E illustrates another embodiment of performing resource switching in an unlicensed spectrum as shown in FIG. 2B.

In an embodiment shown in FIG. 3E, the failure count $COUNT_F$ is initialized to zero (0) (S310E) before performing a first LBT attempt over the current set of resources during the current RACH procedure (S320E) (and before performing an RSRP check over the current set of resources during the current RACH procedure (S330E)).

After initializing the failure count $COUNT_F$ to zero (0), an RSRP check is performed over the current set of resources (S330E) before performing the current LBT attempt over the current set of resources. When the RSRP check over the current set of resources passes (S331E, YES), the current LBT attempt is then performed over the resource(s) of the current set of resources that pass(es) the RSRP check (S320E).

When the current LBT attempt over the resource(s) of the current set of resources that pass(es) the RSRP check passes (S321E, YES), one of the resource(s) of the current set of resources that passes both the RSRP check and the current LBT attempt is used to transmit the RACH message (S390E). When the current LBT attempt over the resource(s) of the current set of resources that pass(es) the RSRP check fails (S321E, NO), the failure count is increase by one (1) (S340E), and no RACH message will be transmitted using the resource(s) of the current set of resources that pass(es) the RSRP check but fail(s) to pass the current LBT attempt. If the failure count $COUNT_F$ has not reached the pre-configured threshold TH_Switch (S360E, NO), the process goes back to S330E to perform a subsequent RSRP check over the current set of resources. If the failure count $COUNT_F$ reaches the pre-configured threshold TH_Switch (S360E, YES), then the current RACH procedure is stopped (S370E).

On the other hand, when the RSRP check over the current set of resources fails (S331E, NO) during the current RACH procedure, the failure count is increase by one (1) (S340E). If the failure count $COUNT_F$ has not reached the pre-configured threshold TH_Switch (S360E, NO), the process goes back to S320E to perform a subsequent RSRP check over the current set of resources. If the failure count COUNT$_F$ reaches the pre-configured threshold TH_Switch (S360E, YES), then the current RACH procedure is stopped (S370E).

After stopping the current RACH procedure, the current set of resources is switched to a new set of resources in the unlicensed spectrum to be utilized by the UE in a new RACH procedure (S320E). In other words, the current set of resources is switched to the new set of resources in the unlicensed spectrum to be utilized by the UE in a new RACH procedure after the failure count COUNT$_F$ over the current set of resources reaches the pre-configured threshold TH_Switch during the current RACH procedure.

After stopping the current RACH procedure and switching from the current set of resources to the new set of resources, a new RACH procedure is initiated, and the failure count COUNT$_F$ will be reset/initialized to zero (0) (e.g., S310E in FIG. 3E). In the new RACH procedure, the new set of resources is utilized by the UE for performing LBT attempts for transmission of an RACH message to the base station. In other words, the new set of resources will become the new "current" set of resources in the new "current" RACH procedure.

In an embodiment, the UE will run the same process shown in FIG. 3E for the new "current" RACH procedure (the feedback path in FIG. 3E). In another embodiment, the UE will run a different process shown in any one of FIGS. 3A-3D (explained above) for the new "current" RACH procedure. In other words, although FIG. 3E shows a feedback path from S380E back to the start point of the same process, the feedback path can also go to the start point of any of the processes in FIGS. 3A-3E for the subsequent "current" RACH procedure.

In an embodiment, the resource switching from a current set of resources (utilized in the current RACH procedure) to a new set of resources (to be utilized in a subsequent current RACH procedure) can be performed for more than once. For example, after switching from the current set of resources to a new set of resource, the new set of resources is utilized as the new "current" set of resources in a new "current" RACH procedure (and the failure count COUNT$_F$ will be reset/initialized to zero (0)). If the failure count COUNT$_F$ again reaches the pre-configured threshold TH_Switch during the new "current" RACH procedure, the new "current" set of resources currently utilized in the new "current" RACH procedure will be again switched to another set of resources to be utilized by the UE in a subsequent "current" RACH procedure. On the other hand, if both an RSRP check and an LBT attempt pass before the failure count COUNT$_F$ reaches the pre-configured threshold TH_Switch during the new "current" RACH procedure, one of the resource(s) of the new "current" set of resources that passes both the RSRP check and the current LBT attempt is used to transmit the RACH message.

In this embodiment, a dynamic resource switching scheme based on the failure count is utilized to change the resources used by the UE for performing LBT attempts for transmission of the RACH message to the base station, so as to reduce the impact of the LBT failure onto the RACH procedures between the UE and the base station, thereby increasing the chance of completing RACH procedure and/or handover procedure. Similar to the embodiment in FIG. 3D, in the embodiment shown in FIG. 3E, not only the LBT failure but also the RSRP failure will be counted toward the failure count COUNT$_F$ for resource switching. In other words, the failure count is increased by one (1) when either of the current LBT attempt and the RSRP check over the current set of resources fails during the current RACH procedure. In this embodiment, the UE will transmits the RACH message only when both the current LBT attempt and the RSRP check over the current set of resources pass, and one of the resource(s) of the current set of resources that passes both the current LBT attempt and RSRP check is used to transmit the RACH message. This would enhance transmission quality of the RACH message by using a resource that has stronger signal strength (i.e., passing the RSRP check) and also passes the LBT attempt.

In an embodiment, when the resource switching is performed for more than once, the processes for the plurality of "current" RACH procedures can be any combination of the processes shown in FIGS. 3A-3E. For example, if the resource switching is performed for three times, then the process for the first "current" RACH procedure can be any one of the processes in FIGS. 3A-3E, the process for the second "current" RACH procedure can be any one of the processes in FIGS. 3A-3E, and the process for the third "current" RACH procedure can be any one of the processes in FIGS. 3A-3E. In other words, the process for any "current" RACH procedures can be the same as or different from the previous "current" RACH procedure and the subsequent "current" RACH procedure. For example, the process for the first "current" RACH procedures can be more strict to require the current set of resources passing both the LBT attempt and RSRP check (e.g., FIG. 3D or 3E), and the process for the second "current" RACH procedures can be less strict to require the current set of resources passing the LBT attempt only but further consider the result of the RSRP check to choose/prioritize the resources to transmit the RACH message (e.g., FIG. 3B or 3C), and the process for the third "current" RACH procedures can be least strict to require the current set of resources passing the LBT attempt only without further considering the result of the RSRP check to choose/prioritize the resources to transmit the RACH message (e.g., FIG. 3A).

In another embodiment, the processes for the plurality of "current" RACH procedures can be selected based on the type of the current set of resources. For example, for the current set of resources that requires better transmission quality, the process for the corresponding RACH procedure can be more strict to require the current set of resources passing both the LBT attempt and RSRP check (e.g., FIG. 3D or 3E) in order to transmit the RACH message. For the current set of resources that prefers to use a resource with stronger signal strength to transmit the RACH message, the process for the corresponding RACH procedure can be less strict to require the current set of resources passing the LBT attempt only but further considering the result of the RSRP check over the current set of resources to choose/prioritize the resources to transmit the RACH message (e.g., FIG. 3B or 3C). For the current set of resources that can use a resource that passes the LBT attempt without the need to stronger signal strength to transmit the RACH message, the process for the corresponding RACH procedure can be least strict to require the current set of resources passing the LBT attempt only without further considering the result of the RSRP check over the current set of resources to choose/prioritize the resources to transmit the RACH message (e.g., FIG. 3A).

In an embodiment, the processes of performing resource switching in an unlicensed spectrum shown in FIGS. 3A-3E can also be applied to a handover procedure to declare a handover failure. In an embodiment, the handover failure is caused by occurrence of a consistent LBT failure or by occurrence of a combination of a consistent LBT failure and RSRP failure.

Figure 4A:
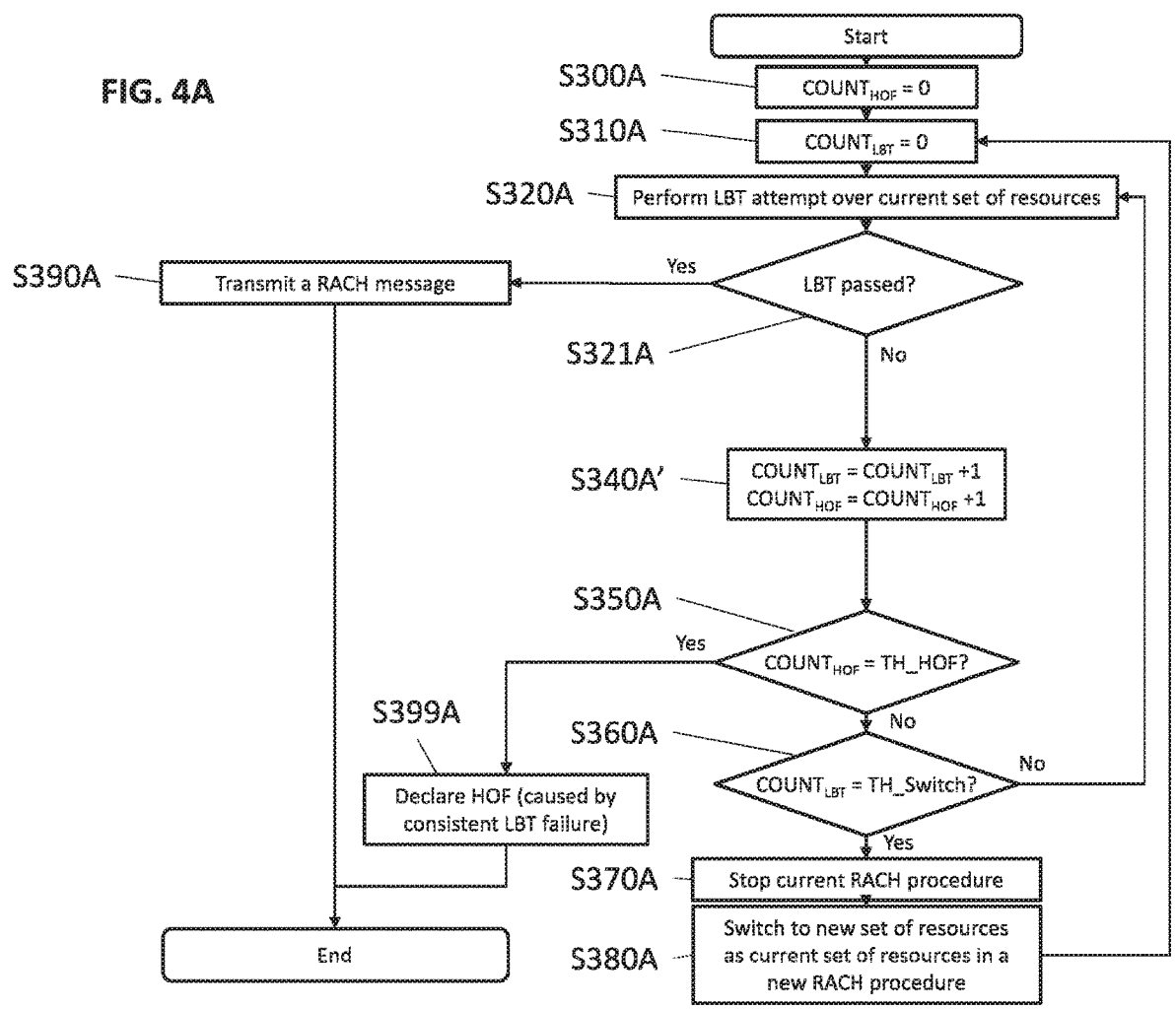
FIGS. 4A-4C illustrate embodiments of applying the processes of performing resource switching in an unlicensed spectrum in FIGS. 3A-3C to a handover procedure.
Figure 4B:
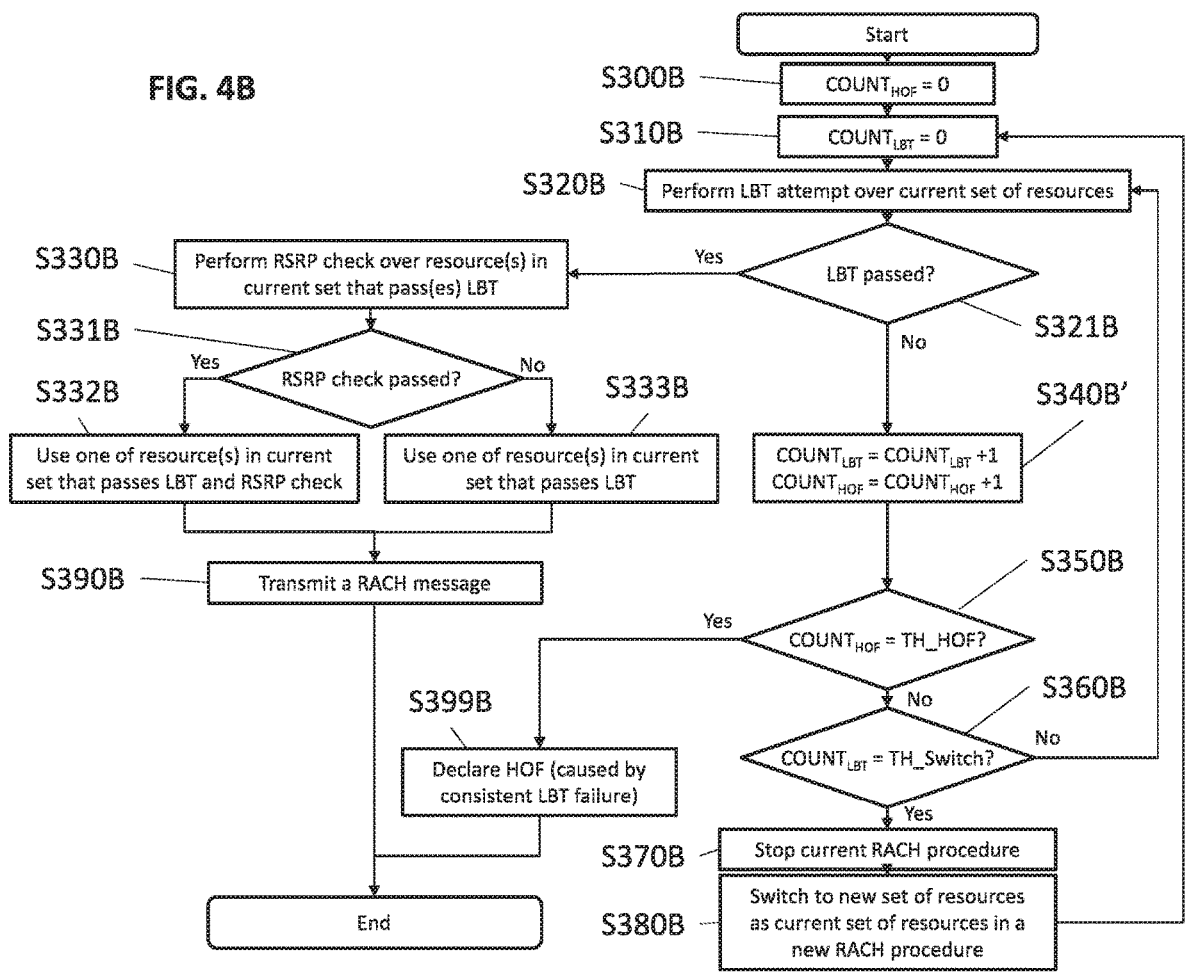
Figure 4C:
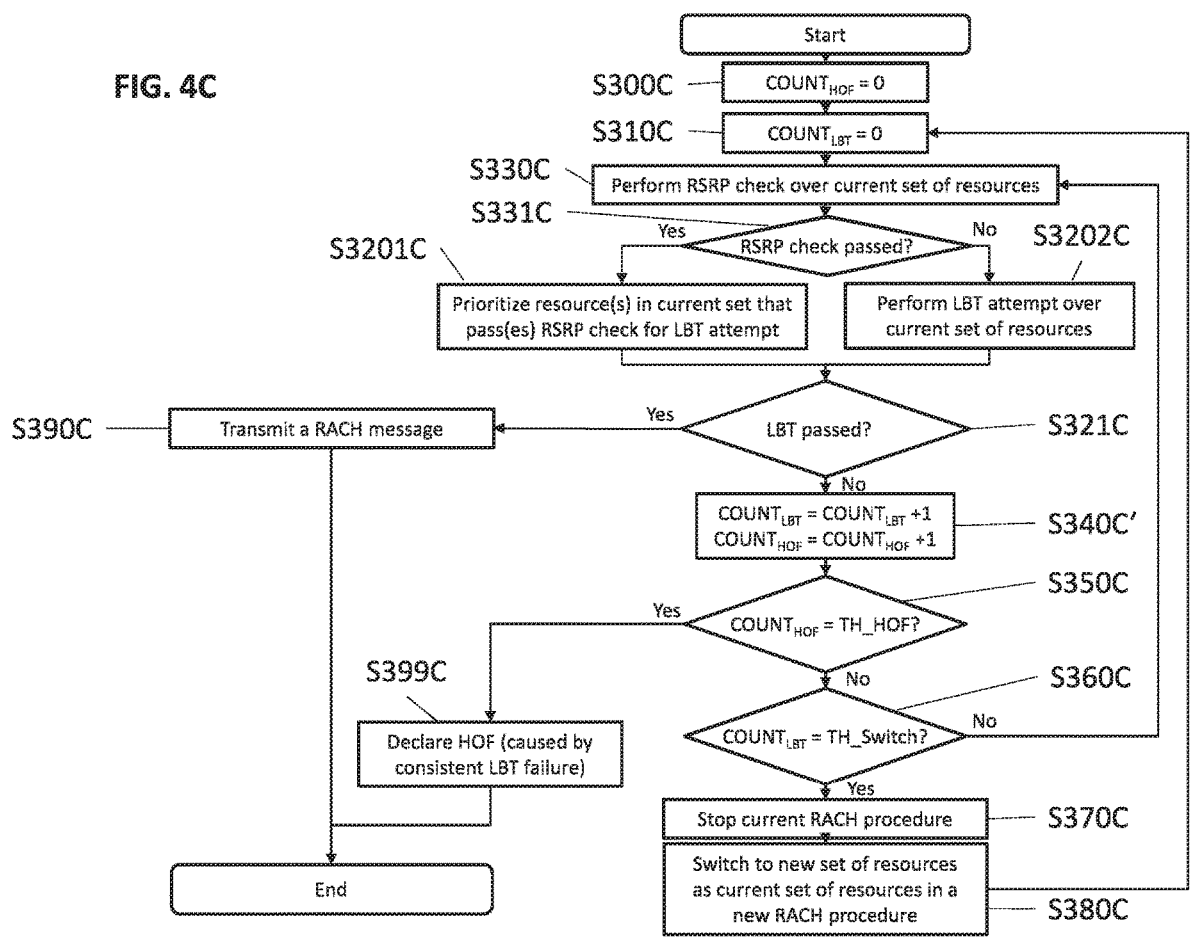
Figure 4D:
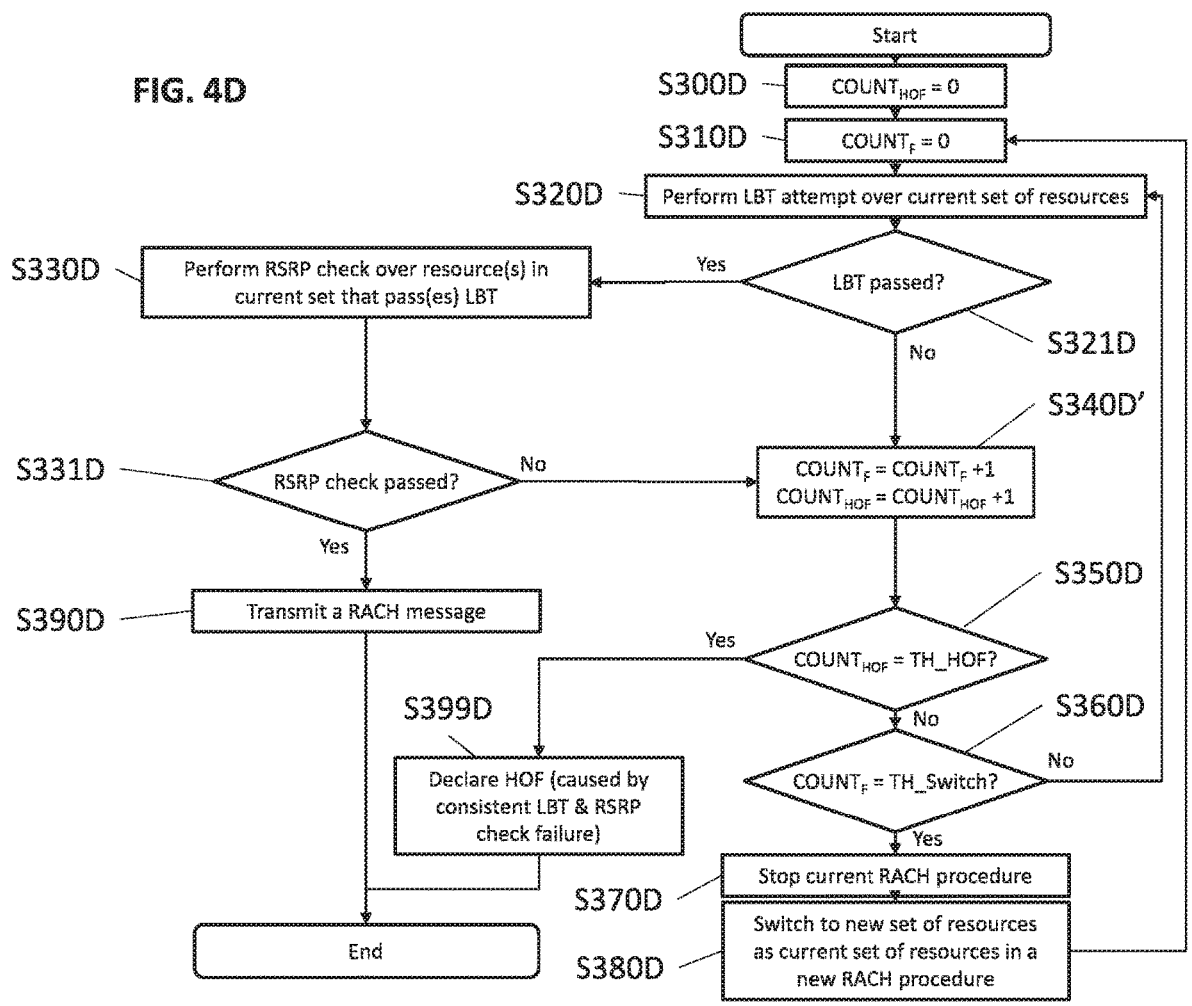
FIGS. 4D-4E illustrate embodiments of applying the processes of performing resource switching in an unlicensed spectrum in FIGS. 3D-3E to a handover procedure.
Figure 4E:
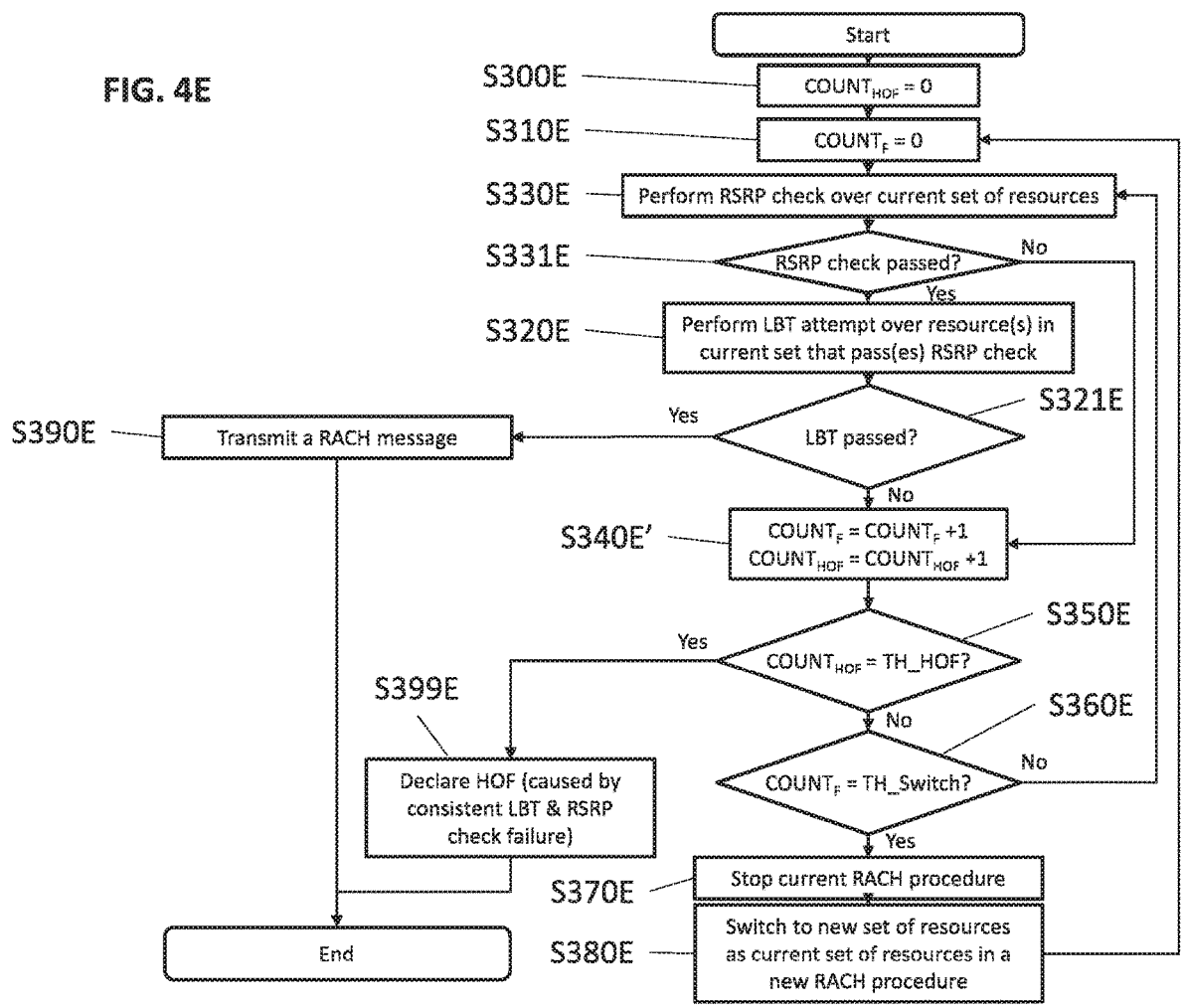

FIGS. 4A-4C illustrate embodiments of applying the processes of performing resource switching in an unlicensed spectrum in FIGS. 3A-3C to a handover procedure to declare a handover failure. In an embodiment, the handover failure is caused by occurrence of a consistent LBT failure. FIGS. 4D-4E illustrate embodiments of applying the processes of performing resource switching in an unlicensed spectrum in FIGS. 3D-3E to a handover procedure to declare a handover failure. In an embodiment, the handover failure is caused by a combination of a consistent LBT failure and RSRP failure.

In the embodiments shown in FIGS. 4A-4E, some of the steps are the same or similar as shown in FIGS. 3A-3E (and the same reference numerals are used for the same or similar steps in FIGS. 3A-3E and 4A-4E, and therefore the description of the same or similar operations of these steps mentioned in FIGS. 3A-3E will be omitted). A count for handover failure declaration $COUNT_{HOF}$ and a pre-configured handover failure threshold TH HOF are further used to determine whether to declare a handover failure.

In embodiments shown in FIGS. 4A-4E, the count for handover failure declaration $COUNT_{HOF}$ is initialized to zero (0) before performing a first LBT attempt over the current set of resources during a first current RACH procedure in a handover procedure (S300A/S300B/S300C/S300D/S300E in FIG. 4A/4B/4C/4D/4E). In addition, the count for handover failure declaration $COUNT_{HOF}$ in the current RACH procedure is not reset before performing a first LBT attempt over any subsequent current set of resources during any subsequent current RACH procedure(s) in the handover procedure (after stopping the current RACH procedure and switching from the current set of resources to the new set of resources), and the count for handover failure declaration $COUNT_{HOF}$ is increased by one (1) with the same or similar condition with the count of LBT failure COUNTLBT or the failure count $COUNT_F$ increased by one (1). For example, the count for handover failure declaration $COUNT_{HOF}$ is increased by one (1) when the count of LBT failure COUNTLBT is increased by one (1) (S340A'/S340B'/S340C' in FIG. 4A/4B/4C) or when the failure count $COUNT_F$ (S340D'/S340E' in FIG. 4D/4E) is increased by one (1). When the count for handover failure declaration $COUNT_{HOF}$ reaches the pre-configured handover failure threshold TH HOF (S350A/S350B/S350C/S350D/S350E in FIG. 4A/4B/4C/4D/4E, YES), a handover failure is declared (S399A/S399B/S399C/S399D/S399E in FIG. 4A/4B/4C/4D/4E).

In an embodiment, the handover failure is declared. In an embodiment, the handover failure is caused by occurrence of a consistent LBT failure (S399A/S399B/S399C in FIG. 4A/4B/4C) or by occurrence of a combination of a consistent LBT failure and RSRP failure (S399D/S399E in FIG. 4D/4E).

In an embodiment, the pre-configured handover failure threshold TH HOF is N times of the pre-configured threshold TH_Switch for the count of LBT failure or the failure count, and N is a total number of sets of resources that are configured to be utilized by the UE for performing the LBT attempts for transmission of the RACH message to the base station.

In addition, similar to or same as the processes shown in FIGS. 3A-3E, the UE will run the same process shown in FIG. 4A for the new "current" RACH procedure (the feedback path in FIG. 4A/4B/4C/4D/4E) after stopping the current RACH procedure and switching from the current set of resources to the new set of resources. In another embodiment, the UE will run a different process shown in any one of FIGS. 4A-4E for the new "current" RACH procedure. In other words, although each of FIGS. 4A-4E shows a feedback path from S380A/S380B/S380C/S380D/S380E back to S310A/S310B/S310C/S310D/S310E, the feedback path can also go to any of S310A/S310B/S310C/S310D/S310E in FIG. 4A/4B/4C/4D/4E for the subsequent "current" RACH procedure in the handover procedure.

In an embodiment, the count for handover failure declaration $COUNT_{HOF}$ in the current RACH procedure is not reset before performing a first LBT attempt over any subsequent current set of resources during any subsequent current RACH procedure(s) in the handover procedure (after stopping the current RACH procedure and switching from the current set of resources to the new set of resources), the count of LBT failure COUNTLBT will be reset/initialized to zero (0) after stopping the current RACH procedure and switching from the current set of resources to the new set of resources (S310A/S310B/S310C/S310D/S310E in FIG. 4A/4B/4C/4D/4E) for resource switching purpose in each subsequent current RACH procedure.

In an embodiment, the processor of the UE is configured to perform the operations shown in FIGS. 2, 2A-2B, 3A-3E and/or 4A-4E, and to control the transceiver to use one of the resource(s) of the current set of resources to transmit the RACH message.

As shown in the illustrated embodiments, the count of LBT failure is used as a factor to determine whether to perform the resource switching for LBT attempts for transmission of an RACH message from the UE to a base station. Therefore, the impact of LBT failure on RACH procedure and/or handover in the unlicensed spectrum can be reduced. In addition, the result of the RSRP check may be further considered for selecting the resources to transmit the RACH message, which allows the use of the resources with stronger signal strength to transmit the RACH message. Furthermore, the result of the RSRP check may also be used to prioritize the order of the resources for performing the LBT attempt thereover, which makes the process more efficient, because it may not be necessary to perform the LBT attempt over some of the resources when some other resources with higher priority pass the LBT attempt. Moreover, in some embodiments, the count of RSRP check failure may also be used as an additional factor to determine whether to perform the resource switching, which would enhance transmission quality of the RACH message by using a resource that passes the LBT attempt and also has stronger signal strength (i.e., passing the RSRP check). Also, applying the processes of performing resource switching in an unlicensed spectrum with a count for handover failure declaration can effectively identify and declare a handover failure. As a result, the proposed dynamic resource switching schemes can effectively reduce the impact of the LBT failure onto the RACH procedures between the UE and the base station, thereby increasing the chance of completing RACH procedure and/or handover procedure.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of performing resource switching in an unlicensed spectrum, a current set of resources in the unlicensed spectrum being utilized by a user equipment (UE) for performing listen-before-talk (LBT) attempts for transmission of a random access channel (RACH) message to a base station, the method comprising:
- performing one or more LBT attempts for transmissions from the UE to the base station over the current set of resources during a current RACH procedure; and
- switching from the current set of resources to a new set of resources in the unlicensed spectrum to be utilized by the UE in a new RACH procedure after a count of LBT failure over the current set of resources reaches a pre-configured threshold during the current RACH procedure,
- wherein the count of LBT failure is increased by one (1) when a current LBT attempt over the current set of resources fails during the current RACH procedure, and
- wherein during the current RACH procedure and before the count of LBT failure over the current set of resources reaches the pre-configured threshold, the method further comprises:
- before performing each of the one or more LBT attempts over the current set of resources, performing a reference signal received power (RSRP) check over the current set of resources.

2. The method of claim 1, further comprising:
initializing the count of LBT failure to zero (0) before performing a first LBT attempt over the current set of resources during the current RACH procedure.

3. The method of claim 2, during the current RACH procedure and before the count of LBT failure over the current set of resources reaches the pre-configured threshold, further comprising:
- when the current LBT attempt over the current set of resources passes, using one of the resource(s) of the current set of resources that passes the current LBT attempt to transmit the RACH message.

4. The method of claim 2,
wherein when the RSRP check over the current set of resources passes, the step of performing the one or more LBT attempts over the current set of resources comprises:
- performing the current LBT attempt over the resource(s) of the current set of resources that pass(es) the RSRP check; and
- when the current LBT attempt over the resource(s) of the current set of resources that pass(es) the RSRP check fails, performing the current LBT attempt over the resource(s) of the current set of resources that fail(s) to pass the RSRP check; and wherein when the RSRP check over the current set of resources fails, the step of performing the one or more LBT attempts over the current set of resources comprises:
- performing the current LBT attempt over the resource(s) of the current set of resources.

5. The method of claim 4, during the current RACH procedure and after performing the current LBT attempt over the current set of resources, further comprising:
- when the current LBT attempt over the resource(s) of the current set of resources that pass(es) the RSRP check passes, using one of the resource(s) of the current set of resources that passes both the RSRP check and the current LBT attempt to transmit the RACH message;
- when the current LBT attempt over the resource(s) of the current set of resources that pass(es) the RSRP check fails, but the current LBT attempt over the resource(s) of the current set of resources that fail(s) to pass the RSRP check passes, using one of the resource(s) of the current set of resources that fails to pass the RSRP check but passes the current LBT attempt to transmit the RACH message; and
- when the RSRP check over the current set of resources fails, but the current LBT attempt over the resource(s) of the current set of resources passes, using one of the resource(s) of the current set of resources that passes the current LBT attempt to transmit the RACH message.

6. The method of claim 2, further comprising:
- declaring a handover failure when a count for handover failure declaration reaches a pre-configured handover failure threshold; and
- initializing the count for handover failure declaration to zero (0) before performing a first LBT attempt over the current set of resources during a first current RACH procedure in a handover procedure,
- wherein the count for handover failure declaration is not reset before performing a first LBT attempt over any subsequent current set of resources during any subsequent current RACH procedure(s) in the handover procedure, and the count for handover failure declaration is increased by one (1) when the count of LBT failure is increased by one (1).

7. The method of claim 6,
wherein the pre-configured handover failure threshold is N times of the pre-configured threshold for the count of LBT failure, and
wherein N is a total number of sets of resources that are configured to be utilized by the UE for performing the one or more LBT attempts for transmission of the RACH message to the base station.

8. The method of claim 6, wherein the handover failure is caused by occurrence of a consistent LBT failure.

9. The method of claim 2, further comprising:
stopping the current RACH procedure after the count of LBT failure reaches the pre-configured threshold but before switching from the current set of resources to the new set of resources.

10. The method of claim 9, further comprising:
after stopping the current RACH procedure and switching from the current set of resources to the new set of resources,
- resetting the count of LBT failure to zero (0); and
- performing the steps of claim 1 using the new set of resources as the current set of resources in the new RACH procedure being the current RACH procedure.

11. A method of performing resource switching in an unlicensed spectrum, a current set of resources in the unlicensed spectrum being utilized by a user equipment (UE) for performing listen-before-talk (LBT) attempts for transmission of a random access channel (RACH) message to a base station, the method comprising:
- performing one or more LBT attempts for transmissions from the UE to the base station over the current set of resources during a current RACH procedure;
- performing a reference signal received power (RSRP) check over the current set of resources either after a current LBT attempt over the current set of resources passes, or before performing the current LBT attempt over the current set of resources; and
- switching from the current set of resources to a new set of resources in the unlicensed spectrum to be utilized by the UE in a new RACH procedure after a failure count over the current set of resources reaches a pre-configured threshold during the current RACH procedure, wherein the failure count is increased by one (1) when either of the current LBT attempt and the RSRP check over the current set of resources fails during the current RACH procedure.

12. The method of claim 11, further comprising:
initializing the failure count to zero (0) before performing any of a first LBT attempt and a first RSRP check over the current set of resources during the current RACH procedure.

13. The method of claim 12,
wherein the RSRP check is performed over the current set of resources only after the current LBT attempt over the current set of resources passes,
wherein the step of performing the RSRP check over the current set of resources during the current RACH procedure comprises: performing the RSRP check over the resource(s) of the current set of resources that pass(es) the current LBT attempt, and
wherein the method further comprises:
when the RSRP check over the resource(s) of the current set of resources that pass(es) the current LBT attempt fails,
increasing the failure count by one (1); and
not transmitting the RACH message using the resource(s) of the current set of resources that pass(es) the current LBT attempt but fail(s) to pass the RSRP check; and
when the RSRP check over the resource(s) of the current set of resources that pass(es) the current LBT attempt passes, using one of the resource(s) of the current set of resources that passes both the current LBT attempt and the RSRP check to transmit the RACH message.

14. The method of claim 12,
wherein the RSRP check is performed over the current set of resources only before performing the current LBT attempt over the current set of resources,
wherein when the RSRP check over the resource(s) of the current set of resources passes, the step of performing the LBT attempt over the current set of resources comprises: performing the current LBT attempt over the resource(s) of the current set of resources that pass(es) the RSRP check,
wherein the method further comprises:
when the current LBT attempt over the resource(s) of the current set of resources that pass(es) the RSRP check fails,
increasing the failure count by one (1); and
not transmitting the RACH message using the resource(s) of the current set of resources that pass(es) the RSRP check but fail(s) to pass the current LBT attempt; and
when the current LBT attempt over the resource(s) of the current set of resources that pass(es) the RSRP check passes, using one of the resource(s) of the current set of resources that passes both the RSRP check and the current LBT attempt to transmit the RACH message.

15. The method of claim 12, further comprising:
declaring handover failure when a count for handover failure declaration reaches a pre-configured handover failure threshold; and
initializing the count for handover failure declaration to zero (0) before performing any of a first LBT attempt and a first RSRP check over the current set of resources during a first current RACH procedure in a handover procedure,
wherein the count for handover failure declaration is not reset before performing any of a first LBT attempt and a first RSRP check over any subsequent current set of resources during any subsequent current RACH procedure(s) in the handover procedure, and the count for handover failure declaration is increased by one (1) when the failure count is increased by one (1).

16. The method of claim 15,
wherein the pre-configured handover failure threshold is N times of the pre-configured threshold for the failure count, and
wherein N is a total number of sets of resources that are configured to be utilized by the UE for performing the one or more LBT attempts and the RSRP checks for transmission of the RACH message to the base station.

17. The method of claim 15, wherein the handover failure is caused by occurrence of a combination of a consistent LBT failure and RSRP failure.

18. The method of claim 12, further comprising:
stopping the current RACH procedure after the failure count reaches the pre-configured threshold but before switching from the current set of resources to the new set of resources.

19. The method of claim 18, further comprising:
after stopping the current RACH procedure and switching from the current set of resources to the new set of resources,
resetting the failure count to zero (0); and
performing the steps of claim 11 using the new set of resources as the current set of resources in the new RACH procedure being the current RACH procedure.

20. A user equipment (UE), a current set of resources in an unlicensed spectrum being utilized by the UE for performing listen-before-talk (LBT) attempts for transmission of a random access channel (RACH) message to a base station, the UE comprising:
a transceiver configured to transmit signals to the base station and receive signals from the base station; and
a processor coupled to the transceiver and configured to:
perform one or more LBT attempts for transmissions from the UE to the base station over the current set of resources during a current RACH procedure;
switch from the current set of resources to a new set of resources in the unlicensed spectrum to be utilized by the UE in a new RACH procedure after a count of LBT failure over the current set of resources reaches a pre-configured threshold during the current RACH procedure; and
increase the count of LBT failure by one (1) when a current LBT attempt over the current set of resources fails during the current RACH procedure,
wherein during the current RACH procedure and before the count of LBT failure over the current set of resources reaches the pre-configured threshold, the processor is further configured to:
before performing each of the one or more LBT attempts over the current set of resources, perform a reference signal received power (RSRP) check over the current set of resources.

21. The user equipment of claim 20, wherein the processor is further configured to:
　initialize the count of LBT failure to zero (0) before performing a first LBT attempt over the current set of resources during the current RACH procedure.

22. The user equipment of claim 21, wherein the processor, during the current RACH procedure and before the count of LBT failure over the current set of resources reaches the pre-configured threshold, is further configured to:
　when the current LBT attempt over the current set of resources passes, control the transceiver to use one of the resource(s) of the current set of resources that passes the current LBT attempt to transmit the RACH message.

23. The user equipment of claim 21,
　wherein when the RSRP check over the current set of resources passes, the processor is configured to perform the one or more LBT attempts over the current set of resources by:
　　performing the current LBT attempt over the resource(s) of the current set of resources that pass(es) the RSRP check; and
　　when the current LBT attempt over the resource(s) of the current set of resources that pass(es) the RSRP check fails, performing the current LBT attempt over the resource(s) of the current set of resources that fail(s) to pass the RSRP check; and
　wherein when the RSRP check over the current set of resources fails, the processor is configured to perform the one or more LBT attempts over the current set of resources by:
　　performing the current LBT attempt over the resource(s) of the current set of resources.

24. The user equipment of claim 23, wherein the processor, during the current RACH procedure and after performing the current LBT attempt over the current set of resources, is further configured to:
　when the current LBT attempt over the resource(s) of the current set of resources that pass(es) the RSRP check passes, control the transceiver to use one of the resource(s) of the current set of resources that passes both the RSRP check and the current LBT attempt to transmit the RACH message;
　when the current LBT attempt over the resource(s) of the current set of resources that pass(es) the RSRP check fails, but the current LBT attempt over the resource(s) of the current set of resources that fail(s) to pass the RSRP check passes, control the transceiver to use one of the resource(s) of the current set of resources that fails to pass the RSRP check but passes the current LBT attempt to transmit the RACH message; and
　when the RSRP check over the current set of resources fails, but the current LBT attempt over the resource(s) of the current set of resources passes, control the transceiver to use one of the resource(s) of the current set of resources that passes the current LBT attempt to transmit the RACH message.

25. The user equipment of claim 21, wherein the processor is further configured to:
　declare a handover failure when a count for handover failure declaration reaches a pre-configured handover failure threshold;
　initialize the count for handover failure declaration to zero (0) before performing a first LBT attempt over the current set of resources during a first current RACH procedure in a handover procedure;
　not reset the count for handover failure declaration before performing a first LBT attempt over any subsequent current set of resources during any subsequent current RACH procedure(s) in the handover procedure; and
　increase the count for handover failure declaration by one (1) when the count of LBT failure is increased by one (1).

26. The user equipment of claim 25,
　wherein the pre-configured handover failure threshold is N times of the pre-configured threshold for the count of LBT failure, and
　wherein N is a total number of sets of resources that are configured to be utilized by the UE for performing the one or more LBT attempts for transmission of the RACH message to the base station.

27. The user equipment of claim 25, wherein the handover failure is caused by occurrence of a consistent LBT failure.

28. The user equipment of claim 21, wherein the processor is further configured to:
　stop the current RACH procedure after the count of LBT failure reaches the pre-configured threshold but before switching from the current set of resources to the new set of resources.

29. The user equipment of claim 28, wherein the processor is further configured to:
　after stopping the current RACH procedure and switching from the current set of resources to the new set of resources,
　reset the count of LBT failure to zero (0); and
　use the new set of resources as the current set of resources in the new RACH procedure being the current RACH procedure.

30. A user equipment (UE), a current set of resources in an unlicensed spectrum being utilized by the UE for performing listen-before-talk (LBT) attempts for transmission of a random access channel (RACH) message to a base station, the UE comprising:
　a transceiver configured to transmit signals to the base station and receive signals from the base station; and
　a processor coupled to the transceiver and configured to:
　　perform one or more LBT attempts for transmissions from the UE to the base station over the current set of resources during a current RACH procedure;
　　perform a reference signal received power (RSRP) check over the current set of resources either after a current LBT attempt over the current set of resources passes, or before performing the current LBT attempt over the current set of resources;
　　switch from the current set of resources to a new set of resources in the unlicensed spectrum to be utilized by the UE in a new RACH procedure after a failure count over the current set of resources reaches a pre-configured threshold during the current RACH procedure; and
　　increase the failure count by one (1) when either of the current LBT attempt and the RSRP check over the current set of resources fails during the current RACH procedure.

31. The user equipment of claim 30, wherein the processor is further configured to:
　initialize the failure count to zero (0) before performing any of a first LBT attempt and a first RSRP check over the current set of resources during the current RACH procedure.

32. The user equipment of claim 31, wherein the processor is further configured to:
perform the RSRP check over the current set of resources only after the current LBT attempt over the current set of resources passes, by performing the RSRP check over the resource(s) of the current set of resources that pass(es) the current LBT attempt;
when the RSRP check over the resource(s) of the current set of resources that pass(es) the current LBT attempt fails,
increase the failure count by one (1); and
not transmit the RACH message using the resource(s) of the current set of resources that pass(es) the current LBT attempt but fail(s) to pass the RSRP check; and
when the RSRP check over the resource(s) of the current set of resources that pass(es) the current LBT attempt passes, control the transceiver to use one of the resource(s) of the current set of resources that passes both the current LBT attempt and the RSRP check to transmit the RACH message.

33. The user equipment of claim 31, wherein the processor is further configured to:
perform the RSRP check over the current set of resources only before performing the current LBT attempt over the current set of resources;
when the RSRP check over the resource(s) of the current set of resources passes, the processor is further configured to perform the LBT attempt over the current set of resources by performing the current LBT attempt over the resource(s) of the current set of resources that pass(es) the RSRP check;
when the current LBT attempt over the resource(s) of the current set of resources that pass(es) the RSRP check fails,
increase the failure count by one (1); and
not transmit the RACH message using the resource(s) of the current set of resources that pass(es) the RSRP check but fail(s) to pass the current LBT attempt; and
when the current LBT attempt over the resource(s) of the current set of resources that pass(es) the RSRP check passes, control the transceiver to use one of the resource(s) of the current set of resources that passes both the RSRP check and the current LBT attempt to transmit the RACH message.

34. The user equipment of claim 31, wherein the processor is further configured to:
declare handover failure when a count for handover failure declaration reaches a pre-configured handover failure threshold;
initialize the count for handover failure declaration to zero (0) before performing any of a first LBT attempt and a first RSRP check over the current set of resources during a first current RACH procedure in a handover procedure;
not reset the count for handover failure declaration before performing any of a first LBT attempt and a first RSRP check over any subsequent current set of resources during any subsequent current RACH procedure(s) in the handover procedure; and
increase the count for handover failure declaration by one (1) when the failure count is increased by one (1).

35. The user equipment of claim 34,
wherein the pre-configured handover failure threshold is N times of the pre-configured threshold for the failure count, and
wherein N is a total number of sets of resources that are configured to be utilized by the UE for performing the one or more LBT attempts and the RSRP checks for transmission of the RACH message to the base station.

36. The user equipment of claim 34,
wherein the handover failure is caused by occurrence of a combination of a consistent LBT failure and RSRP failure.

37. The user equipment of claim 31, wherein the processor is further configured to:
stop the current RACH procedure after the failure count reaches the pre-configured threshold but before switching from the current set of resources to the new set of resources.

38. The user equipment of claim 37, wherein the processor is further configured to:
after stopping the current RACH procedure and switching from the current set of resources to the new set of resources,
reset the failure count to zero (0); and
use the new set of resources as the current set of resources in the new RACH procedure being the current RACH procedure.

* * * * *